Sept. 17, 1968  HISAO FUTAKI ET AL  3,402,131

THERMISTOR COMPOSITION CONTAINING VANADIUM DIOXIDE

Filed July 27, 1965

INVENTORS
HISAO FUTAKI, KAZUO KOBAYASHI,
MINORU AOKI, TAKESHI SHIMODA,
EIZABURO YAMADA, KOZIRO NARITA

H. Edward Mesterr

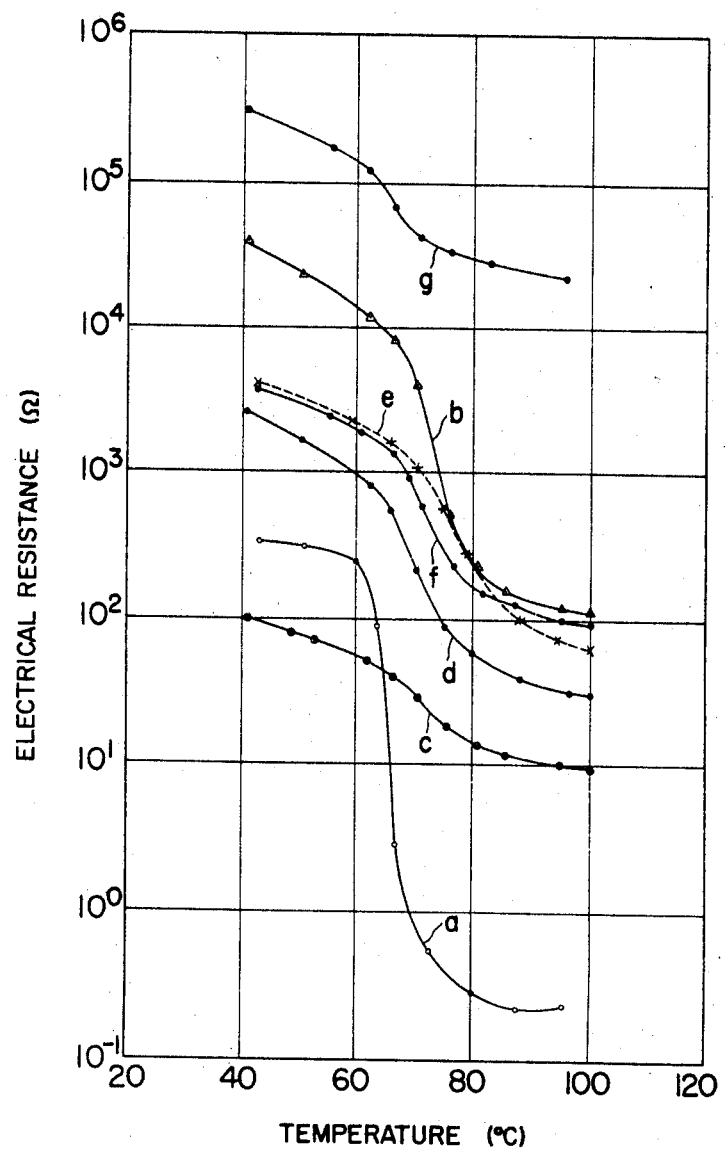

United States Patent Office 3,402,131
Patented Sept. 17, 1968

3,402,131
THERMISTOR COMPOSITION CONTAINING
VANADIUM DIOXIDE
Hisao Futaki, Kazuo Kobayashi, Minoru Aoki, Takeshi Shimoda, Eizaburo Yamada, and Koziro Narita, Tokyo-to, Japan, assignors to Kabushiki Kaisha Hitachi Seisakusho, Tokyo-to, Japan, a joint-stock company of Japan
Filed July 27, 1965, Ser. No. 475,129
Claims priority, application Japan, July 28, 1964, 39/42,462
51 Claims. (Cl. 252—512)

ABSTRACT OF THE DISCLOSURE

A resistor consisting principally of vanadium dioxide ($VO_2$) crystals whose resistance value changes abruptly at 65–70° C., wherein a material such as Ge, Fe, Co, Ni, Mn, Ti, Nb, W, Mo, Ta or Cr is present in a state of a solid solution. The $VO_2$ crystals are enclosed in a sintered oxide member, and electrodes are fitted thereon.

---

This invention relates to a resistor in which vanadium oxide semiconductors are used, and the electric resistance of which changes abruptly in a certain range of temperature.

In U.S. patent application Ser. No. 266,245, now abandoned, "Oxide Semiconductor," we have mentioned a resistor in which vanadium dioxide $VO_2$ (or $V_2O_4$) is used as a vanadium oxide semiconductor, and the resistance value of which decreases abruptly in a certain range of temperature, (said resistor being called hereinafter "negative abruptly changing resistor"). In contrast to the thermistors heretofore used in which the resistance value increases or decreases in a steady manner with temperature, this negative abruptly changing resistor has a resistance value changing abruptly at a temperature of from 65° to 70° C. This resistor is made by preparing, as a starting material, a mixture which is mainly composed of a vanadium oxide, for example, vanadium pentoxide $V_2O_5$, and one or more materials selected from magnesium oxide MgO, calcium oxide CaO, barium oxide BaO, strontium oxide SrO, lead oxide PbO, lanthanum oxide $La_2O_3$, phosphorus pentoxide $P_2O_5$, boron trioxide $B_2O_3$ and silicon dioxide $SiO_2$ added thereto and by heat-treating said mixture in a reducing atmosphere.

The property of the resistor thus obtained to change abruptly its electrical resistance at a critical temperature is considered to be due to the fine grains of crystals of $VO_2$ which are formed during the heat-treatment. The electrical properties of the $VO_2$ crystal will be described hereinafter. However, $VO_2$ is generally unstable, and it has been difficult to obtain stable crystals of $VO_2$. This is the reason why the negative abruptly changing resistor mainly composed of vanadium oxide heretofore has not been reduced to practical uses. A practical and novel negative abruptly changing resistor was first disclosed by us, as mentioned above, and is exhibiting excellent performance in various applications, such as temperature controllers, temperature alarm devices, fire alarms, controllers for temperature compensation in electronic devices and signal oscillators.

However, a negative abruptly changing resistor heretofore used as mentioned above is restricted by the properties of the $VO_2$ crystal, and the range of temperature in which the resistance value changes abruptly has been limited the range of from 65° to 70° C. This limitation was considered as an advantage from the view point of interchangeability of resistance elements, but, on the contrary, it has been considered as a restriction in various applications.

It is the main object of this invention to provide a resistor the resistance value of which changes abruptly also in a range, higher or lower than that of the abruptly changing temperature of the negative abruptly changing resistor heretofore used.

In this invention, for achieving this object, a particular substance, that is, at least one element selected from the group consisting of germanium Ge, iron Fe, nickel Ni, cobalt Co, manganese Mn, titanium Ti, chromium Cr, niobium Nb, tungsten W, tantalum Ta and molybdenum Mo, is added to the $VO_2$ crystal to cause a substitution or an interstitial structure thereof in a part of said crystal lattice, thus forming a solid solution.

As for an example of shifting the range of temperature in which electrical resistance changes abruptly, I. J. Austin has succeeded, according to his report (The Philosophical Magazine, vol. 7, p. 961), in shifting said range of temperature by applying a pressure of several tens of kilobars on vanadium oxide VO (the temperature at which its electrical resistance changes abruptly being about −155° C.) and on vanadium trioxide $V_2O_3$ (said temperature being about −105° C). However, it is difficult in practice to apply a pressure such as several tens of kilobars. Accordingly, it has not been easy to shift the range of temperature in which the electrical resistance of a negative abruptly changing resistor of vanadium oxide is abruptly changed.

It is another object of this invention to provide a negative abruptly changing resistor which can be easily manufactured.

Furthermore, according to this invention, for the purpose of increasing the degree of abrupt change of electrical resistance, or for increasing the stability of the resistor, a substance which vitrifies with vanadium oxide, such as phosphorus P, strontium Sr, Barium Ba, lead Pb, tellurium Te, uranium U, is added.

This invention will be more clearly understood from the following description taken in connection with the accompanying drawings in which:

FIGS. 11 through 35, are graphical representations indicating the temperature-resistance characteristics of said resistors.

Figure 1:
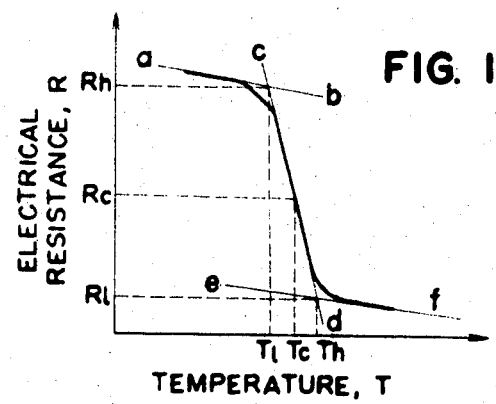
FIG. 1 is a simplified graphical representation indicating the temperature-resistance characteristic of a negative abruptly changing resistor.

Referring now to FIG. 1, the negative abruptly changing resistor has a temperature-resistance characteristic as shown therein. As is clear from this figure, the resistance decreases gradually with increasing temperature up to a certain temperature $Tl$, and decreases abruptly from said temperature $Tl$ up to another temperature $Th$. Further, in the region higher than the range of temperature in which resistance changes abruptly (from $Tl$ to $Th$) the resistance again decreases gradually. (With some material compositions, the resistance increases.) In this electrical characteristic, the resistance value at which the resistance starts to change abruptly owing to the increase of temperature is designated by $Rh$, that at which the resistance just completes its abrupt change is designated by $Rl$, that at which the resistance is situated at the middle point of the abrupt change is designated by $Rc$, and the temperatures corresponding to $Rh$, $Rl$ and $Rc$ are denoted respectively by $Tl$, $Th$ and $Tc$. Accordingly, $Tc$ and $\psi$ which will be used in the following description can be determined by the following equations:

$$Tc = \frac{Tl + Th}{2}, \quad \psi = \log_{10}\left(\frac{Rh}{Rl}\right)$$

$Tc$ will be called "resistance abruptly changing temperature" or "critical temperature," and $\psi$ will be called "abruptly changing degree of electric resistance" or simply as "resistance abruptly changing degree."

Figure 2:
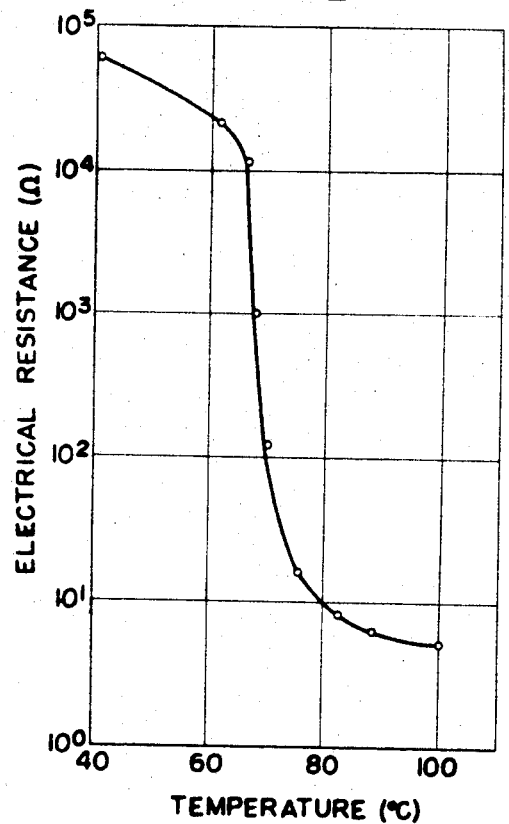
FIG. 2 is a similar graph for the negative abruptly changing resistor heretofore described by us.
Figure 3:
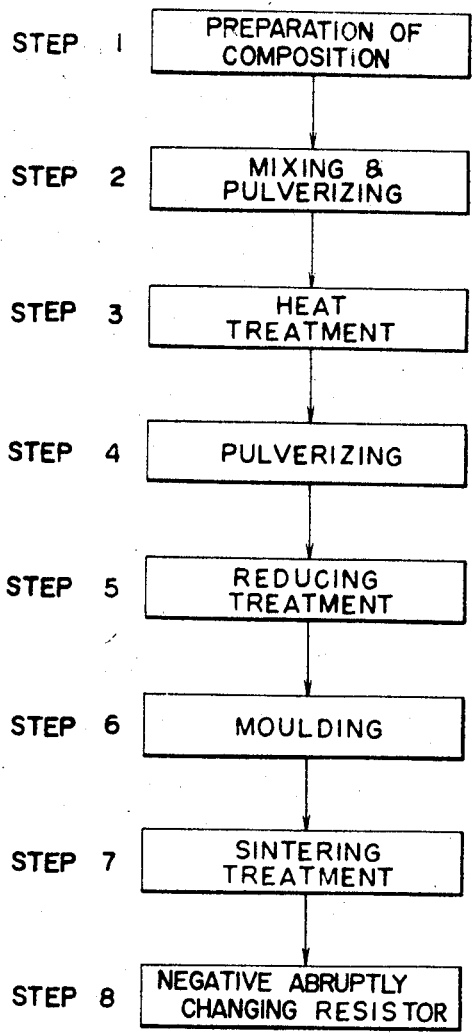
FIG. 3 is a process diagram showing one example of manufacturing process of the negative abruptly changing resistor according to this invention.

In FIG. 2, there is shown the temperature-resistance characteristic of a typical negative abruptly changing resistor as previously disclosed by us. The range of abruptly changing temperature of this resistor is from 65° C. to 70° C. The abruptly changing temperature $Tc$ thereof is about 68° C. The material composition is as follows: 60 mol percent of vanadium pentoxide, $V_2O_5$, 30 mol percent of strontium oxide SrO, and 10 mol percent of phosphorus pentoxide $P_2O_5$. The negative abruptly changing resistor of this invention is produced according to a process as shown in FIG. 3.

Step 1 (preparation of composition)

The material composition consists of a first component of $V_2O_5$ and of a second component added thereto of at least one substance selected from the group consisting of germanium dioxide $GeO_2$, ferric oxide $Fe_2O_3$, tricobalt tetroxide $Co_3O_4$, manganese dioxide $MnO_2$, titanium dioxide $TiO_2$, nickel oxide NiO, chromium trioxide $Cr_2O_3$, niobium pentoxide $Nb_2O_5$, tungsten trioxide $WO_3$, molybdenum trioxide $MoO_3$ and tantalum pentoxide $Ta_2O_5$, or said composition consists of said first and second components and of a third component added thereto of substances which vitrify with the first component of $V_2O_5$ such as $P_2O_5$, SrO, BaO, PbO, $TeO_2$, and $U_3O_8$.

Step 2 (mixing)

The material composition obtained through Step 1 is fully mixed.

Step 3 (heat-treatment)

By heat-treating at a temperature above the melting point (about 670° C.) of $V_2O_5$, the material composition is fused and mixed. We have fused and mixed the composition for one hour in air at a temperature of 1000° C.

The material composition thus fused and mixed becomes a complex oxide which contains in mixture $V_2O_5$, the oxides added as the second component such as $GeO_2$, $Fe_2O_3$, $MnO_2$ and so on, vanadates of said oxides, oxides of vanadium having low-valence, etc.

Step 4 (pulverizing)

The complex oxide mentioned above is fully milled.

Step 5 (reducing)

The complex oxide milled as above is heat-treated in a reducing atmosphere to transform a part or the main part of $V_2O_5$ into $VO_2$. The product obtained through the reduction treating has a composition in which are conjugated $VO_2$, $V_2O_5$, intermediate compound of $VO_2$ and $V_2O_5$, and other oxides added as the second or third component.

We have carried out this reduction treatment in a reducing atmosphere through which ammonia ($NH_3$) was passed at a flowrate of 100 cc./min., wherein a suitable reducing temperature was in the range of 350° C. to 400° C., and a suitable reducing time was between 30 min. to 120 min. Said reducing temperature and reducing time are variable depending on the substances added as the second and third components and the preparation proportions of the material composition.

Step 6 (molding)

After fully milling the reduction product, the product is shaped in the form of bead type, rod type, disc type or in flakes.

Step 7 (sintering)

The product thus shaped is sintered in a reducing atmosphere or in a neutral atmosphere and then is left to cool. We have heated it for several minutes at a sintering temperature of about 1000° C.

The negative abruptly changing resistor thus obtained has the following composition. That is, said resistor is a sintered body of complex oxide which consists mainly of (1) crystal of $VO_2$, (2) $V_2O_5$ and (3) other vanadiums of low valence, and further in which there are found in the form of simple substance or of vanadate the oxides added as said second or third component.

The material composition of the resistor has been expressed above in mol percent; that is, $V_2O_5$ of 60 mol percent, SrO of 30 mol percent and $P_2O_5$ of 10 mol percent. However, the valence of vanadium is changed in the heat treatment mentioned above, whereby it was difficult to determine the composition of the finished resistor in mol percent. Therefore, in the following description, the composition of material or finished product will be expressed in gram-atom ratio of the metallic elements excepting oxygen, that is, vanadium, strontium and phosphorus. For example, in the preceding example, the composition will be shown as $V:Sr:P=12:3:2$. Otherwise, said composition may be shown as $V:Sr:P=71:18:11$, wherein the total amount of gram-atoms is 100% (the composition may also be indicated simply as $V_{7.1}$, $Sr_{1.8}$, $P_{1.1}$. In the following description, such indication will be used in most cases).

Figure 5:
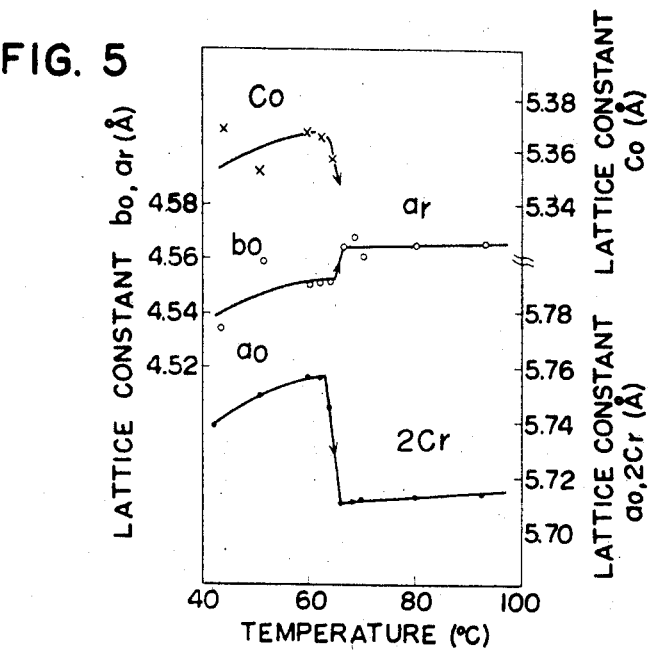
FIG. 5 and FIG. 6 show characteristic curves indicating the variation with temperature of the lattice constant of the $VO_2$ crystal in negative abruptly changing resistors according to this invention and according to the prior art.
Figure 6:
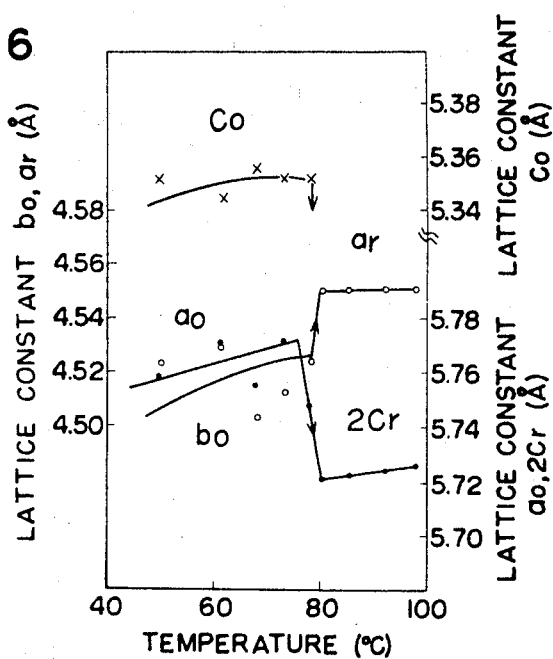

In a negative abruptly changing resistor, it is the fine grain of crystal of $VO_2$ in said resistor that plays the leading role in exhibiting the abruptly changing characteristic. The crystal of $VO_2$ undergoes phase-transition at a temperature about $Tc$. It takes the rutile structure belonging to the monoclinic system in the lower-temperature region, and the rutile structure belonging to the tetragonal system in the higher-temperature region. With such a transition of crystal, the electrical conduction mechanism of said crystal of $VO_2$ shifts from a semiconductive mechanism to a metallic conduction mechanism. In FIG. 5 and in FIG. 6, for the negative abruptly changing resistor (composition of material: $V_8$, $Ge_1$, $P_1$) and for that which was used heretofore (composition of material: $V_{7.1}$, $Sr_{1.8}$, $P_{1.1}$), respectively, there are shown changes of the lattice-constant of crystals of $VO_2$ with temperature. Between lattice-constants $a_o$, $b_o$, $c_o$ of the monoclinic system and those of tetragonal system $a_r$, $c_r$, there are interrelations such as $a_o \simeq 2c_r$, $b_o \simeq a_r$, $c_o \simeq a_o - c_r$, with the directions of observation through the diffraction of X-rays.

In particular, the lattice-constant $c_r$ of C-axis direction in the rutile structure of the tetragonal system shows the direct atomic distance of vanadium in the crystal lattice, and it is supposed that the electronic condition of $3d$ shell concerning the vanadium atom in this C-axis direction attributes principally to the electric conductivity of the crystal of $VO_2$.

According to this invention, by causing substitution or interstitial structure of particular substances, such as Ge, Fe, Co, Mn, Ti, Ni, Cr, Nb, W, Mo and Ta, in the fine grain of crystal of $VO_2$ playing the leading part of the negative abruptly changing resistor, the necessary quantity of energy for the phase-transition of the crystal of VO$_2$ is changed, whereby the resistance abruptly changing temperature is shifted. Accordingly, the oxides of Ge, Fe, Co, Mn, Ti, Ni, Cr, Nb, W, Mo and Ta mentioned above are essential as material composition components of the negative abruptly changing resistor of this invention, and by causing their substitution or interstitial structure in a part of the crystal lattice of fine grain of crystal of VO$_2$ in the negative abruptly changing resistor, they are considered to have the following effects on the crystal of VO$_2$.

(1) The ion radius of Ge, Fe, Co, Mn, Ti, Ni, Cr, Nb, W, Mo and Ta is different from that of the V$^{4+}$ ion, whereby a distortion is imparted to the crystal lattice of the VO$_2$ crystal. That is, the value of lattice constant $c_r$ of the VO$_2$ crystal in the C-axis direction (which is equal to $a_0/2$ in the rutile structure of the monoclinic system) is changed.

(2) The V$^{4+}$ ion is substituted by a substance, the number of $d$-electrons of which is different from that of said V$^{4+}$ of the VO$_2$ crystal. Consequently, the number of valence bond electrons is changed, whereby the bond degree between the vanadium atom in the VO$_2$ crystal in the region lower than $Tc$ is changed.

As a result of the above effects (1) and (2), the necessary quantity of energy for phase transition of the crystal is changed; thus $Tc$ itself is shifted. The mechanism of shift of $Tc$ will be described later in detail.

When a substitution or interstitial structure of another substance takes place in the VO$_2$ crystal to make a solid solution, the following conditions for the substance to make said solid solution can be enumerated: (1) said substance has an ionic radius close to that of the V$^{4+}$ ion, (2) it has a valence equal to that of VO$_2$, (3) it has a crystal structure similar to that of VO$_2$. The elements such as Ti, V, Mn, Fe, Co, Ni, are so-called 3$d$-transition elements which start from Sc (atomic number 21) and end at Ni (atomic number 28), and these elements, which are situated in the 4th cycle of the periodic table, have an imperfect $d$-shell (not vacant) in the outer shell and do not have $p$-electrons. As is well known, these 3$d$-transition metals are characterized by the fact that they have variable valence. Accordingly, oxides of these transition elements are considered to easily substitute the V$^{4+}$ ion of crystal of VO$_2$, owing to the factors of ion radius, valence and so on. Further, oxides of Ge which is not a 3$d$-transition metal can form a solid solution with VO$_2$. As for the reason of the latter fact, it can be mentioned that the oxides of Ge have a crystal structure of the rutile system similar to that of VO$_2$, that the valence of Ge is four, and that the ion radius of Ge is similar to V$^{4+}$. Further, the oxides of Nb, W, Mo and Ta, among materials capable of shifting resistance abruptly changing temperature into the lower-temperature region, have crystal structures similar to that of VO$_2$, therefore, these substances readily form solid solutions with VO$_2$. Accordingly, if a large quantity of these substances is used for the material composition, the greater part of these substances forms solid solutions with the VO$_2$ crystal to transform said crystal into a nonstoichiometric form, thereby considerably decreasing the resistance abruptly changing property of the VO$_2$ crystal itself. Therefore, according to our experiments, it is necessary that the quantity of these substances added be less than 10% of the total material composition.

Table 1 and Table 2 show lattice constants of crystal structure obtained through X-ray diffraction relating to a typical negative abruptly changing resistor of this invention.

Table 1 shows the results of X-ray diffraction at an atmospheric temperature of 25° C. The calculation of lattice constants is based on the face exponent of every diffraction line according to the X-ray diffraction data of VO$_2$ which was measured by G. Anderson and set forth in an A.S.T.M. (American Society for Testing Materials) card. The lattice constants of vanadium dioxide VO$_2$ in this table are those which are shown on the A.S.T.M. card.

Further, the material compositions (V$_{7.1}$, Sr$_{1.8}$, P$_{1.1}$), (V$_6$, Ag$_3$, Sr$_1$) and (V$_9$, P$_1$) correspond to the negative abruptly changing resistor heretofore used having abruptly changing temperature $Tc$ from 65° C. to 68° C.

TABLE 1

| Material Composition | $a_0$ (A.) | $b_0$ (A.) | $c_0$ (A.) | $\beta$ (deg.) | $Tc$ (° C.) |
|---|---|---|---|---|---|
| V$_{7.1}$, Sr$_{1.8}$, P$_{1.1}$ | 5.75 | 4.52 | 5.39 | 122.7 | ≃66 |
| V$_6$, Ag$_3$, Sr$_1$ | 5.76 | 4.53 | 5.37 | 122.5 | ≃65 |
| V$_9$, P$_1$ | 5.75 | 4.55 | 5.35 | 122.6 | ≃68 |
| V$_7$, Ge$_1$, Ag$_1$ | 5.79 | 4.51 | 5.32 | 123.3 | ≃82 |
| V$_8$, Ge$_1$, Sr$_1$ | 5.82 | 4.58 | 5.31 | 123.8 | ≃78 |
| V$_8$, Ge$_1$, P$_1$ | 5.86 | 4.56 | 5.39 | 124.3 | ≃83 |
| V$_7$, Ti$_2$, P$_1$ | 5.82 | 4.50 | 5.38 | 122.5 | ≃78 |
| VO$_2$ | 5.743 | 4.517 | 5.375 | 122.6 | ---------- |

Table 2 shows the results of X-ray diffraction at a surrounding temperature above the resistance abruptly changing temperature $Tc$.

TABLE 2

| Material Composition | $a_r$ (A.) | $c_r$ (A.) | $Tc$ (° C.) | X-ray diffraction Temp. (° C.) |
|---|---|---|---|---|
| V$_{7.1}$, Sr$_{1.8}$, P$_{1.1}$ | 4.558 | 2.857 | ≃66 | 70 |
| V$_{8.0}$, Ge$_{1.0}$, P$_{1.0}$ | 4.534 | 2.871 | ≃78 | 82 |
| V$_{5.0}$, Co$_{3.0}$, P$_{2.0}$ | 4.566 | 2.845 | ≃58 | 66 |
| V$_{7.0}$, Ti$_3$, P$_{1.0}$ | 4.554 | 2.878 | ≃78 | 82 |
| V$_{8.0}$, Nb$_{0.1}$, P$_{1.6}$ | 4.554 | 2.853 | ≃58 | 63 |
| V$_{8.9}$, W$_{0.1}$, P$_{1.0}$ | 4.557 | 2.852 | ≃41 | 51 |
| V$_{8.5}$, Mo$_{0.5}$, P$_{1.6}$ | 4.530 | 2.851 | ≃51 | 56 |
| V$_{7.1}$, Sr$_{1.8}$, P$_{1.1}$ | 4.558 | 2.857 | ≃66 | 70 |

As clearly shown in Table 1, the lattice constants of VO$_2$ in the negative abruptly changing resistor heretofore used at room temperature are approximately equal to those set forth on the A.S.T.M. card. Furthermore, $Tc$ of said resistor corresponds to the phase transition temperature (about 68° C.) of VO$_2$. From these two facts, it will be apparent that VO$_2$ plays the leading role in the negative abruptly changing resistor.

In the rutile structure of the monoclinic system of VO$_2$ crystal in a region lower than $Tc$, in the axial direction, which is approximately given by the lattice constant $a_0$, the distance between vanadium atoms has a long part and short part.

A pair of atoms of said short part is tightly bonded with each other, and that of said long part is bonded with each other relatively loosely. According to G. Anderson (Acta Chemica Scandinavica, vol. 9, p. 1378), in the crystal lattice of VO$_2$, the shorter part of the distance between atoms which is bonded to make a pair is 2.65 A., and the other part is 2.12 A. The lattice constants $a_0$ shown in Table 1 give approximately the sum of said longer part and shorter part of distance between atoms of vanadium.

The lattice constants in the negative abruptly changing resistor of this invention are different from those of resistors heretofore known. For example, in Table 1, in the case of the material composition (V$_8$, Ge$_1$, P$_1$) in which $Tc$ is 83° C., the lattice constant $a_0$ is longer by 1.7% in comparison with those in resistors heretofore used.

As clearly seen in Table 2, of the negative abruptly changing resistors according to this invention, one which has lower resistance abruptly changing temperature $Tc$ than that of a heretofore known resistor (material composition; V$_{7.1}$, Sr$_{1.8}$, P$_{1.1}$) has a smaller lattice constant $C_r$ than that of said heretofore known resistor, and one which has a higher temperature $Tc$ has a larger lattice constant than that of said heretofore known resistor. However, a definite interrelationship between the resistance abruptly changing temperature $Tc$ and the lattice constant $c_r$ cannot be determined.

The reason for this fact is that the case in which the shift of $Tc$ is caused by the above mentioned effect (2) is included here. That is, the shift of $Tc$ is reasonably attributed to two cases: (1) the substance which forms a solid solution with $VO_2$ causes the lattice constant to change, and (2) said substance causes the number of valence bond electrons to change, as mentioned above.

As a result of said effects (1) and (2), $Tc$ shifts into the region lower or higher than that of the heretofore used resistor. This mechanism will be described herebelow by use of a qualitative model devised by us concerning the electrically conductive mechanism of $VO_2$.

Various opinions are reported on the electrical conductivity of oxides of $3d$-transition metals. For example, according to Mott (Philosophical Magazine, vol. 6, p. 287), the distance between vanadium atoms is close to the critical distance at which the transition between metal and nonmetal takes place, and when said critical distance is increased above said distance between vanadium atoms owing to an increase of temperature, metallic conductivity appears. Further, Goodenough (Physical Review, vol. 117, p. 1442) notes the direct effect between vanadium ions $V^{4+}$ with each other and explains that, in the region above the transition temperature, an overlap of wave functions of $d$-electron between $V^{4+}$ takes place to impart metallic electrical conductivity and that, in the region below the transition temperature, on the contrary, $V^{4+}$ by two's form covalent bands to exhibit semiconductivity. Then, Adler and Feinleib (Physical Review Letters, vol. 12, No. 25, p. 700) explain the transition of $V_2O_3$ from semiconductor to metal by the aid of the qualitative models of Mott, Goodenough and so on, wherein they assume band models consisting of valence band, band gap and conduction band of general semiconductors and confirm that the band gap of semiconductors depends upon the number of electrons excited in the conduction band.

The present inventors have noted the fact that the vanadium atoms in the crystal of $VO_2$ make pairs with each other and have devised the following qualitative models relating to the electrically conductive mechanism of the negative abruptly changing resistor of this invention, which models are nearly similar to those of Adler and others.

The $3d$ trace of vanadium atom degenerates in the condition of free atoms and is in the same energy condition; however, the $3d$ trace belonging to a pair of vanadium atoms bonded in the crystals of oxides of $VO_2$ is divided into bonding level and anti-bonding level energy conditions, and, owing to the interaction of a pair of vanadium atoms expanding in the crystal, said bonding level forms a bonding band, and said anti-bonding level forms an anti-bonding band. Said bonding band is then at a lower energy level than said anti-bonding band with a certain energetic band (called band gap or forbidden band) therebetween. It is supposed that the electrons in the antibonding band contributes to the electrical conductivity. When owing to the increase in temperature the electrons are excited in the anti-bonding band through the band gap from the bonding band, said excited atoms contribute no longer to the chemical binding, whereby the bond degree of the pair of vanadium atoms, is decreased, and the difference between bonding level and anti-bonding level is reduced. Therefore, the band gap is narrowed. Thereby, the electrons are more easily excited, with the increase in temperature, from bonding band to anti-bonding band, the crystal undergoes phase-transition in the proximity of a certain temperature $Tc$, the anti-bonding band and the bonding band constituting the same band to exhibit metallic conductivity at the temperature over $Tc$.

Therefore, for the purpose of shifting into the higher or lower region the temperature $Tc$ in question in this invention, that is, the temperature at which the transition from semi-conductor to metal takes place, it is sufficient to change beforehand the width of said band gap. In other words, when the width of the band gap is enlarged beforehand, it becomes difficult to excite the electrons in the anti-bonding band to shift $Tc$ into the region of higher temperature. On the contrary, when the band gap is narrowed, $Tc$ can shift into the lower region.

As for the methods for shifting the width of band gap, the following two cases will be considered.

(1) To change the distance of a pair of vanadium atoms by changing the lattice constant. As described above, in the crystal of $VO_2$, vanadium atoms are arranged in an axial direction shown approximately by $a_o$, a longer part and a shorter part of distance between said atoms repeating alternately. A pair of atoms of said shorter part of distance bond tightly with each other, and a pair of atoms of said longer part of distance bond with each other relatively loosely in comparison with said pair of atoms of shorter part of distance. By changing the distance of the atoms forming a pair, that is, the aforementioned lattice constant $a_o$, the band gap can be changed.

(2) To change the band gap by loosening the bond of two vanadium atoms forming a pair through putting beforehand electron into the anti-bonding band.

From the abovementioned considerations (1) and (2), it is sufficient to proceed as follows;

For shifting $Tc$ into the higher region:

(1) In the crystal of $VO_2$, to give rise to a substitution or a interstitial structure of a substance which can make longer the lattice constant of C-axial direction which corresponds to the above mentioned $a_o$-axial direction, below $Tc$.

(2) To substitute $V^{4+}$ ion by a substance which has a lower valence electron than the $d$-electron of said ion $V^{4+}$.

For shifting $Tc$ into the lower region:

To cause a substitution or a interstitial structure of a substance which acts contrary to (1) and (2), that is, a substance which makes shorter the lattice constant or which has higher valence electrons than the $d$-electron of $V^{4+}$ ion.

(1) and (2) mentioned above are none other than the two effects described above.

However, as is clear from Table 1, the substitution or interstitial structure of said substance into the $VO_2$ crystal is accompanied by a certain change of lattice constant owing to the difference of ion radius of said substance and so on. Therefore, we have to think that either of said effects (1) and (2) or the shifting mechanism of $Tc$ in question is predominant.

The material composition of the negative abruptly changing resistor according to this invention is a two-component system which consists of oxides of vanadium and of at least one oxide, as the second component, selected from oxides of Ge, Fe, Co, Mn, Ti, Cr, Nb, W, Mo and Ta as mentioned above, but with some substance as second component, the abruptly changing property is considerably deteriorated. In other word, the value of $\psi$ is reduced. The reasons for this reduction of $\psi$ may be as follows:

(1) There takes place a substitution or interstitial structure of said added substance in the fine grain of crystal in the negative abruptly changing resistor, whereby surplus electrons or holes appear, which results in an increase of conductivity of phase in the lower-temperature region to reduce the value of $\psi$.

(2) The added substance of the second component changes the atmosphere of $V_2O_5$ in the processes of reduction and sintering. Consequently, the composition of the fine grain of $VO_2$ in the finished negative abruptly changing resistor is transformed from the stoichiometric composition.

(3) The balance of said added substance of the second component which has constituted with the $VO_2$ crystal a solid solution exists between the fine grains of $VO_2$, this remaining part of said substance being either conductive or insulating and being connected in series or in parallel with said fine grains. Even if the value of $\psi$ of the fine grains of $VO_2$ crystal is large, said value is reduced because of the general quality of this electrical network.

For the purpose of increasing the value of $\psi$, a substance vitrifying with $V_2O_5$ is used as the third component. The negative abruptly changing resistor of this invention can be caused by adding the third component to acquire better electrical characteristics than a resistor with only the first and second components. According to our experiments, a suitable quantity of P, Sr, Pb, Ba and so on added as the third component 40% or less of the material composition.

The oxides of P, Sr, Ba, Pb, etc., which vitrify with $V_2O_5$, do not substitute or enter directly into the fine grains of $VO_2$ in the negative abruptly changing resistor because of their ion radius, valence, crystal structure and so on. Rather, they vitrify with a part of $V_2O_5$ in the process of heat-treating, the resulting vitreous material enclosing the fine grains of $VO_2$ crystal in the negative abruptly changing resistor. The reason why the value of $\psi$ is increased by the addition of the third component is not clear, but it is thought that the vitreous material causes the fine grains of $VO_2$ crystal to contact electrically more closely with each other from the viewpoint of the abovementioned reason for decrease of $\psi$, that said vitreous material causes the composition of $VO_2$ produced in the production treatment to balance into a stoichiometric structure, and that said material restricts the quantity of intermediate compounds of vanadium other than $VO_2$ produced from $V_2O_5$.

Another advantage of the negative abruptly changing resistor which is made by adding the third component is the long life of said resistor. That is, the substance added as the third component vitrifies to envelope the fine grains of $VO_2$ in the negative abruptly changing resistor, thereby shutting off the crystal of $VO_2$ from the outer atmosphere. Consequently, the characteristic of changing with time of the resistance value in the negative abruptly changing resistor is stabilized, which results in a long life of said resistor.

Figure 7:
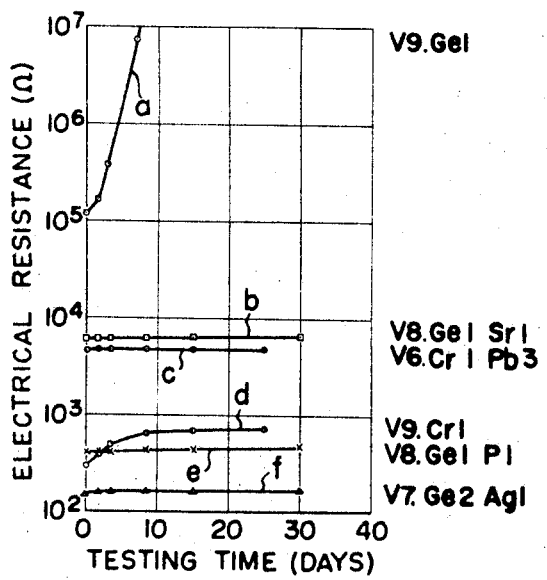
FIG. 7 is a graphical representation indicating the change with time of the negative abruptly changing resistor according to the invention.

FIG. 7 shows the results of life tests in air at 100° C. for investigating the stability of the negative abruptly changing resistor. The abscissa indicates the number of days when said resistor was left in air at 100° C., and the ordinate the electrical resistance determined at 40° C. after the resistor was left in the air of 100° C. These tests were carried out because a change of characteristics had been anticipated owing to the oxidation of $VO_2$, the main component of said resistor, into $V_2O_5$. In fact, in a resistor having an inferior stability, $Rh$ and $Rl$ (refer to FIG. 1) is increased with testing time, whereas $\psi$ is reduced. In this FIG. 7, the curves $a$, $b$, $c$, $d$, $e$, and $f$ correspond to resistors of $(V_9, Ge_1)$, $(V_8, Ge_1, Sr_1)$, $(V_6, Cr_1, Pb_3)$, $(V_9, Cr_1)$, $(V_8, Ge_1, P_1)$ and $(V_7, Ge_2, Ag_1)$ respectively.

Two composition systems of $(V_9, Cr_1)$ and $(V_9, Ge_1)$ have low stability, but four composition systems of $(V_6, Cr_1, Pb_3)$, $(V_8, Ge_1, Sr_1)$, $(V_8, Ge_1, P_1)$ and $(V_7, Ge_2, Ag_1)$ have high stability.

The following examples more fully indicate the nature of the invention.

Figure 4:
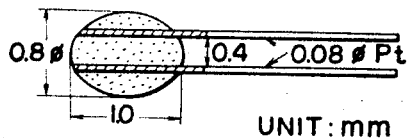
FIG. 4 is a sectional view showing an embodiment of bead type of the negative abruptly changing resistor according to the invention.
Figure 8:
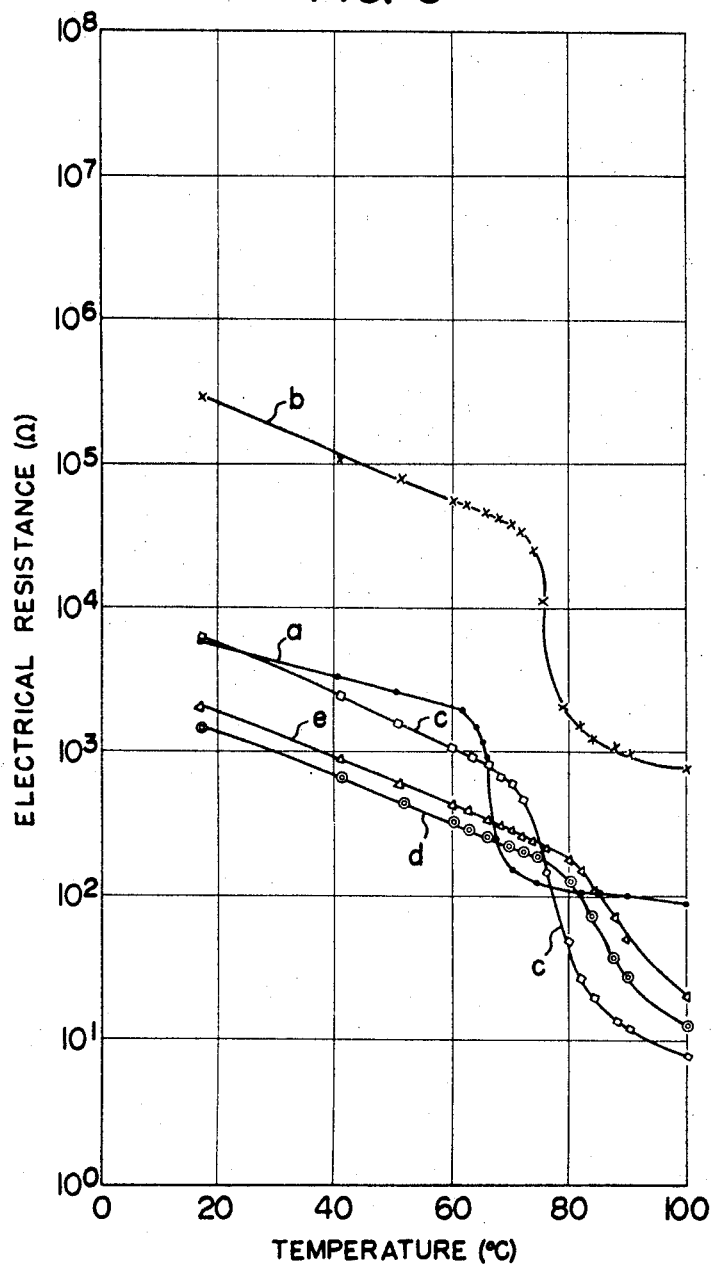
FIG. 8 is a graphical representation indicating the temperature-resistance characteristic of the negative abruptly changing resistor according to the invention.

Example 1.—Vanadium pentoxide $V_2O_5$ and germanium dioxide $GeO_2$ are prepared in such a manner that the gram-atom ratio of metallic elements other than the oxygen atom of said compounds is V:Ge=9:1 (step 1) (hereinbelow, the quantity of metallic oxides in the material composition will be shown in the gram-atom of metallic elements other than oxygen atom). Then after thorough milling (step 2), said product is transferred into a crucible of alumina, which is heat-treated in an electric oven at 1000° C. for one hour to produce a vitreous substance (step 3). This mixture thus fused is a complex of oxides containing $V_2O_5$, $GeO_2$, vanadate of Ge, oxides of vanadium of low valence and so on. This complex oxide is amply milled again (step 4). The powdered material thus milled is charged in an oven through which $NH_3$ gas passes at a flow-rate of 100 cc./min., to reduce said material at 350° C. for 30 minutes for obtaining a reduction product (step 5). This reduction product is amply milled to produce a powdery product, which is then transformed into a paste by the use of a binder such as distilled water, which paste is applied between two lengths of platinum wire constituting electrodes as shown in FIG. 4 (step 6). After drying, the resulting bead is sintered for 5 minutes at a temperature of 1000° C. in an inert atmosphere such as $N_2$, and then said bead is rapidly cooled in an inert atmosphere such as $N_2$ (step 7). The characteristics of the element thus obtained of bead form are shown in Table 3 and FIG. 8. There are shown in the same table and figure the characteristics of other negative abruptly changing resistors of bead form which were obtained under the same manufacturing conditions as those of $(V_9, Ge_1)$ with various preparation proportions of materials.

TABLE 3

| Material Composition | Tc (° C.) | $\psi$ | Characteristic curves shown in— |
|---|---|---|---|
| $V_{10}$ | 67 | 1.1 | Fig. 8a. |
| $V_{9.5}$, $Ge_{0.5}$ | 73 | 0.8 | |
| $V_{9.0}$, $Ge_{1.0}$ | 76 | 1.4 | Fig. 8b. |
| $V_{8.5}$, $Ge_{1.5}$ | 81 | 1.3 | |
| $V_{8.0}$, $Ge_{2.0}$ | 78 | 1.3 | Fig. 8c. |
| $V_{7.5}$, $Ge_{2.5}$ | 80 | 1.1 | |
| $V_{7.0}$, $Ge_{3.0}$ | 85 | 0.6 | Fig. 8d. |
| $V_{6.5}$, $Ge_{3.5}$ | 86 | 0.5 | |
| $V_{6.0}$, $Ge_{4.0}$ | 87 | 0.3 | Fig 8e. |

Figure 9:
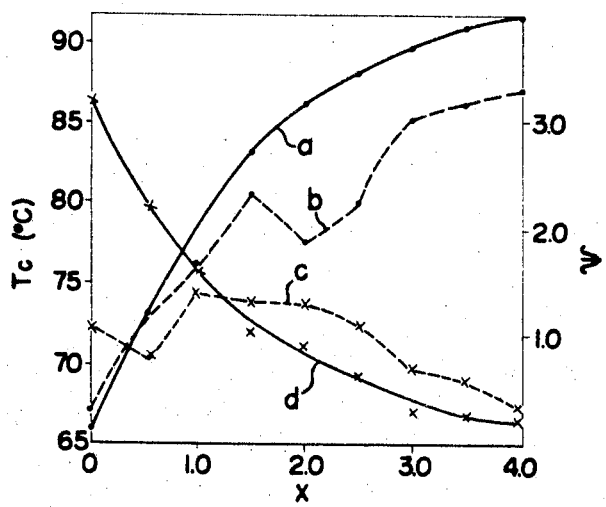
FIG. 9 and FIG. 10 are graphical representations indicating the change of electric characteristic of said resistors and their material composition.

In FIG. 9, Tc and $\psi$ of Table 3 are represented by the ordinate, and the added quantity X of $GeO_2$ by the abscissa. (For example, when X=1.0, the material composition of the negative abruptly changing resistor is $V_9$, $Ge_1$. In general, for the value of X, the material composition is $V_{10-x}$, $Ge_x$.) The curves $b$ and $c$ show the changes of Tc and $\psi$, respectively, in accordance with the added quantity of $GeO_2$.

As is clear from said curves $b$ and $c$, with an increase of the added quantity X of $GeO_2$, Tc increases, but $\psi$ increases up to X=1.5, from which $\psi$ decreases.

As for the reason why $\psi$ decreases over X=1.5, it is thought that the negative abruptly changing characteristic of the electrical resistance of $VO_2$ for a change of temperature is blocked by the characteristic of $GeO_2$, considering the fact that a diffraction image of $GeO_2$ (hexagonal system) appears when over X=1.5.

Table 4 shows the characteristic of negative abruptly changing resistors which were made in exactly the same manufacturing conditions as those of the two-component system of V-Ge, varying the preparation proportions of the material composition (vanadium pentoxide $V_2O_5$, germanium dioxide $GeO_2$, diammonium phosphate $(NH_4)_2HPO$). In Table 4, $(V_{9.5}, Ge_{0.5}, P_{1.1})$ means that, assuming the total amount 11.1 of gram-atom of metallic elements in material combination, the amount of V is 9.5, that of Ge being 0.5, and that of P being 1.1 presuming that $(NH_4)_2HPO_4$ is subjected to a pyrolysis-reaction to form $P_2O_5$. In other words, it means that 4.75 mol of $V_2O_5$, 0.5 mol of $GeO_2$ and 1.1 mol of $(NH_4)_2HPO_4$ were prepared amounting to 6.35 mol. The variation of preparation proportions was effected by changing V; Ge, P being constant 1.1.

TABLE 4

Figure 11:
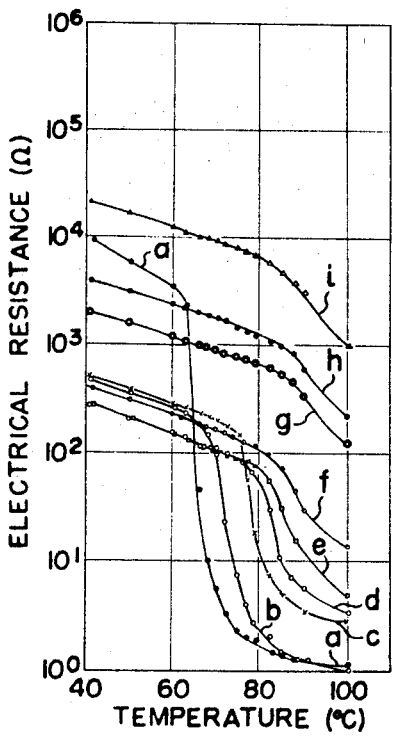

| Material Composition | Tc (° C.) | $\psi$ | Characteristic curves shown in— |
|---|---|---|---|
| $V_{10}$, $P_{1.1}$ | 66 | 3.2 | Fig. 11a. |
| $V_{9.5}$, $Ge_{0.5}$, $P_{1.1}$ | 73 | 2.2 | Fig. 11b. |
| $V_{9.0}$, $Ge_{1.0}$, $P_{1.1}$ | 78 | 1.6 | Fig. 11c. |
| $V_{8.5}$, $Ge_{1.5}$, $P_{1.1}$ | 83 | 1.0 | Fig. 11d. |
| $V_{8.0}$, $Ge_{2.0}$, $P_{1.1}$ | 83 | 0.9 | Fig. 11e. |
| $V_{7.5}$, $Ge_{2.5}$, $P_{1.1}$ | 87 | 0.5 | Fig. 11. |
| $V_{7.0}$, $Ge_{3.0}$, $P_{1.1}$ | 90 | 0.3 | Fig. 11g. |
| $V_{6.5}$, $Ge_{3.5}$, $P_{1.1}$ | 91 | 0.25 | Fig. 11h. |
| $V_{6.0}$, $Ge_{4.0}$, $P_{1.1}$ | 92 | 0.2 | Fig. 11i. |

The curves $a$ and $d$ show the variations of Tc and $\psi$, respectively, with the added quantity of $GeO_2$, Tc and $\psi$ being represented by the ordinate, and the added quantity X of $GeO_2$ by the abscissa (the preparation proportion of the material composition being then shown by $V_{10-x}$, $Ge_x$, $P_{1.1}$).

As is clear from the curves $a$ and $d$ of FIG. 9, when the value of X increases, Tc increases up to about 90° C., whereas $\psi$ decreases and nearly disappears in the proximity of 90° C. of Tc. Referring now to FIG. 11 concerning the value of electric resistance, the value of electrical resistance of the negative abruptly changing resistor of $X=0.5$ (that is, material composition of $V_{9.5}$, $Ge_{0.5}$, $P_{1.1}$) at 40° C. is reduced to less than $\frac{1}{10}$ in comparison with that of a resistor of $X=0$ (that is, material composition of $V_{10}$, $P_{1.1}$). This value remains nearly the same from $X=0.5$ to $X=2.5$. Such an effect is due to the increase of conductivity at a temperature below Tc due to the addition of $GeO_2$. On the other hand, at a temperature over Tc, the electrical resistance is increased by the addition of $GeO_2$, the conductivity decreasing, and the metallic conductivity shifting to semiconductivity. Over $X=3.0$, the electric resistance at temperatures over and below Tc increases, and $\psi$ decreases gradually. This tendency is the same in the case of the two-component system of $V_2O_5$, $GeO_2$. The reason why $\psi$ decreases is that surplus $GeO_2$ is formed in the negative abruptly changing resistor over $X=1.0$ as in the case of the two-component system.

As is clear from abovedescribed example, there is a suitable value of the added quantity of oxide of Ge which can be defined by Tc or $\psi$, and said quantity is preferably 40% or less.

Table 5 shows the characteristics of negative abruptly changing resistors which have material compositions of the three-component system consisting of $V_2O_5$, $GeO_2$ and a third component selected from the oxides of Ag, Sr, U and Na (for Sr, $SrCO_3$ was used. This compound is easily pyrolized into SrO by heat-treating) or which have material compositions of the four-component system consisting of $V_2O_5$, $GeO_2$, $(NH_4)_2HPO_4$, $SrCO_3$,

TABLE 5

Figure 12:
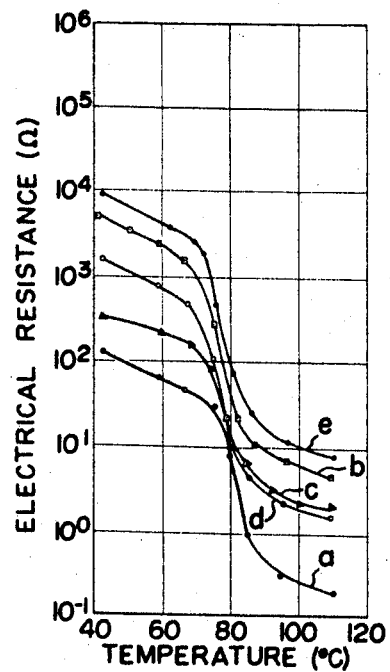

| Material Composition | Tc (° C.) | $\psi$ | Characteristic curves shown in— |
|---|---|---|---|
| $V_7$, $Ge_2$, $Ag_1$ | 82 | 1.9 | Fig. 12a. |
| $V_8$, $Ge_1$, $Sr_1$ | 78 | 2.1 | Fig. 12b. |
| $V_8$, $Ge_1$, $U_1$ | 80 | 1.7 | Fig. 12c. |
| $V_7$, $Ge_2$, $Na_1$ | 78 | 2.1 | Fig. 12d. |
| $V_{7.65}$, $Ge_{0.85}$, $P_{0.5}$, $Sr_{1.0}$ | 79 | 2.1 | Fig. 12e. |

When $GeO_2$ is used as the second component, $GeO_2$ itself is apt to vitrify with $V_2O_5$. Therefore, an oxide of Ag can be used specially as the third component.

Tc of the negative abruptly changing resistor which was made by adding an oxide of Ge as a component of the material composition as mentioned above is shifted into a higher region in comparison with that of said resistors heretofore used.

Example 2.—We have produced negative abruptly changing resistors according to the process indicated in FIG. 3, using as material composition the two-component system of vanadium pentoxide $V_2O_5$, and ferric oxide $Fe_2O_3$ and the three-component system of $V_2O_5$, $Fe_2O_3$, and $(NH_4)_2HPO$, reduction temperature and time of step 5 of FIG. 3 being 400° C. and 30 minutes, respectively, and other conditions being the same as in Example 1. The results obtained are shown in Tables 6 and 7.

TABLE 6

Figure 13:
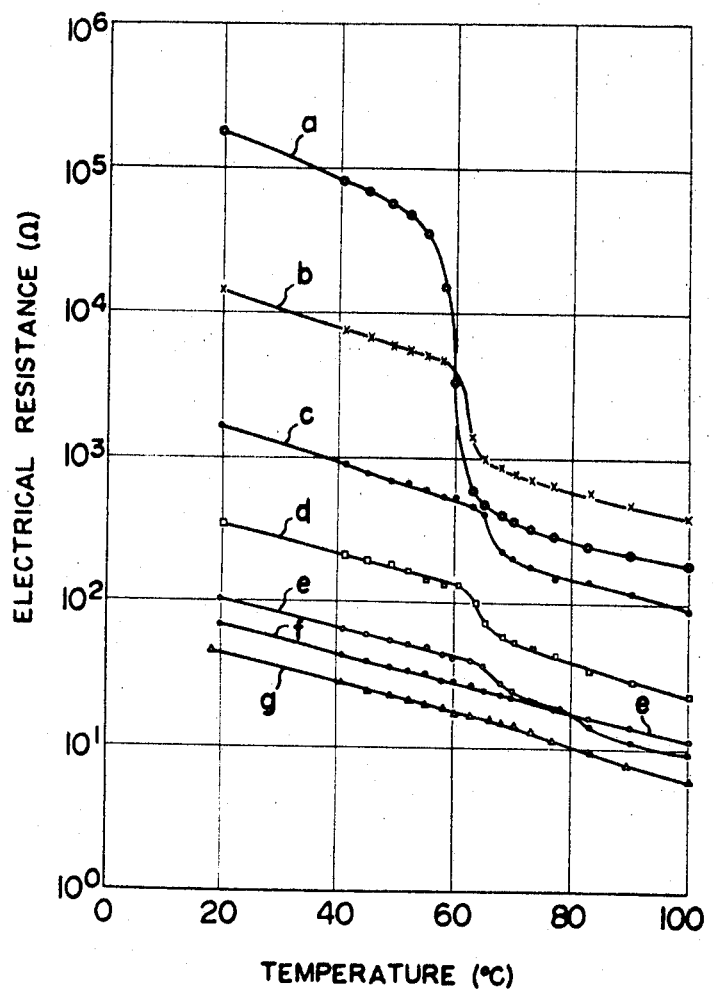

| Material Composition | Tc (° C.) | $\psi$ | Characteristic curves shown in— |
|---|---|---|---|
| $V_{9.5}$, $Fe_{0.5}$ | 60 | 1.7 | Fig. 13a. |
| $V_{9.0}$, $Fe_{1.0}$ | 62 | 0.4 | Fig. 13b. |
| $V_{8.5}$, $Fe_{1.5}$ | 65 | 0.3 | Fig. 13c. |
| $V_{8.0}$, $Fe_{2.0}$ | 65 | 0.2 | Fig. 13d. |
| $V_{7.5}$, $Fe_{2.5}$ | 66 | 0.1 | Fig. 13e. |
| $V_{7.0}$, $Fe_{3.0}$ |  |  | Fig 13f |
| $V_{6.0}$, $Fe_{4.0}$ |  |  | Fig. 13g. |

TABLE 7

Figure 14:
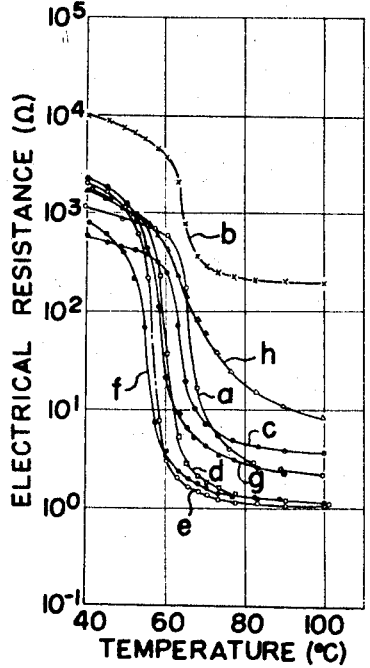

| Material Composition | Tc (° C.) | $\psi$ | Characteristic curves shown in— |
|---|---|---|---|
| $V_{9.5}$, $Fe_{0.5}$, $P_{2.5}$ | 65.5 | 2.0 | Fig. 14a. |
| $V_{9.0}$, $Fe_{1.0}$, $P_{2.5}$ | 64 | 1.3 | Fig. 14b. |
| $V_{8.5}$, $Fe_{1.5}$, $P_{2.5}$ | 63 | 1.7 | Fig. 14c. |
| $V_{8.0}$, $Fe_{2.0}$, $P_{2.5}$ | 61.5 | 2.6 | Fig. 14d. |
| $V_{7.5}$, $Fe_{2.5}$, $P_{2.5}$ | 56 | 2.8 | Fig. 14e. |
| $V_{7.0}$, $Fe_{3.0}$, $P_{2.5}$ | 55 | 2.4 | Fig. 14f. |
| $V_{6.5}$, $Fe_{3.5}$, $P_{2.5}$ | 59 | 2.3 | Fig. 14g. |
| $V_{6.0}$, $Fe_{4.0}$, $P_{2.5}$ | 65 | 1.4 | Fig. 14h. |

Figure 10:
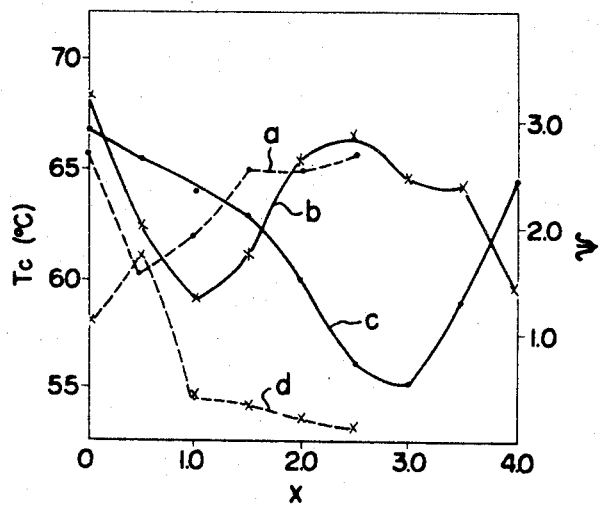

In FIG. 10, Tc and $\psi$ of Tables 6 and 7 are represented by the ordinate, and the added quantity X of $Fe_2O_3$ by the abscissa. If the added quantity of $Fe_2O_3$ is X, the material composition is designated $V_{10-x}$, $Fe_x$ for the 2-component system and $V_{10-x}$, $Fe_x$, $P_{2.5}$ for the 3-component system. In this figure, curves $a$, $b$, $c$ and $d$ show respectively Tc of $V_{10-x}$, $Fe_x$, $\psi$ of $V_{10-x}$, $Fe_x$, $P_{2.5}$, Tc of $V_{10-x}$, $Fe_x$, $P_{2.5}$ and $\psi$ of $V_{10-x}$, $Fe_x$.

Now observing the change of Tc and $\psi$ of a negative abruptly changing resistor having the material composition of $V_{10-x}$, $Fe_x$, $P_{2.5}$, with increase of X from 0.5, Tc decreases gradually to the minimum at $X=3.0$, Tc being then about 55° C. With further increase of X, Tc returns to the higher region, when $\psi$ decreases. This tendency is similar to that of the 2-component system of $V_{10-x}$, $Fe_x$.

In the 2-component system of $V_{10-x}$, $Fe_x$, $\psi$ decreases when X is over 2.5. At this moment, a diffraction image of hematite ($Fe_2O_3$) begins to appear in the X-ray diffraction image. This is attributed to the fact that $Fe_2O_3$ added as a component of the material composition remains in the crystal, and not in the condition of a solid solution. In general $\psi$ of $V_{10-x}$, $Fe_x$ is small. The reason for this is thought to be that $Fe_2O_3$ does not vitrify with vanadium, remaining as a crystal, thereby deteriorating the electrical contact between the $VO_2$ crystals in the negative abruptly changing resistor. However, in the 3-component system, an added quantity of Fe up to 40% is permissible.

Table 8 shows the characteristics of negative abruptly changing resistors which were produced, according to the process indicated in FIG. 3 under the same manufacturing conditions of the 2-component system of $V_2O_5$, $Fe_2O_3$, from a material composition of the 4-component system of $V_2O_5$, $SrCO_3$, $(NH_4)_2HPO_4$, $SrCO_3$ having a preparation proportion of V:Fe:P:Sr=7:0.5:1.0:1.5 and from another material composition of the 5-component system of $V_2O_5$, $Fe_2O_2$, $(NH_4)_2HPO_4$, $SrCO_3$, PbO having a preparation proportion of V:Fe:P:Sr:Pb=7:0.5:1.0:1.0:0.5.

TABLE 8

Figure 15:
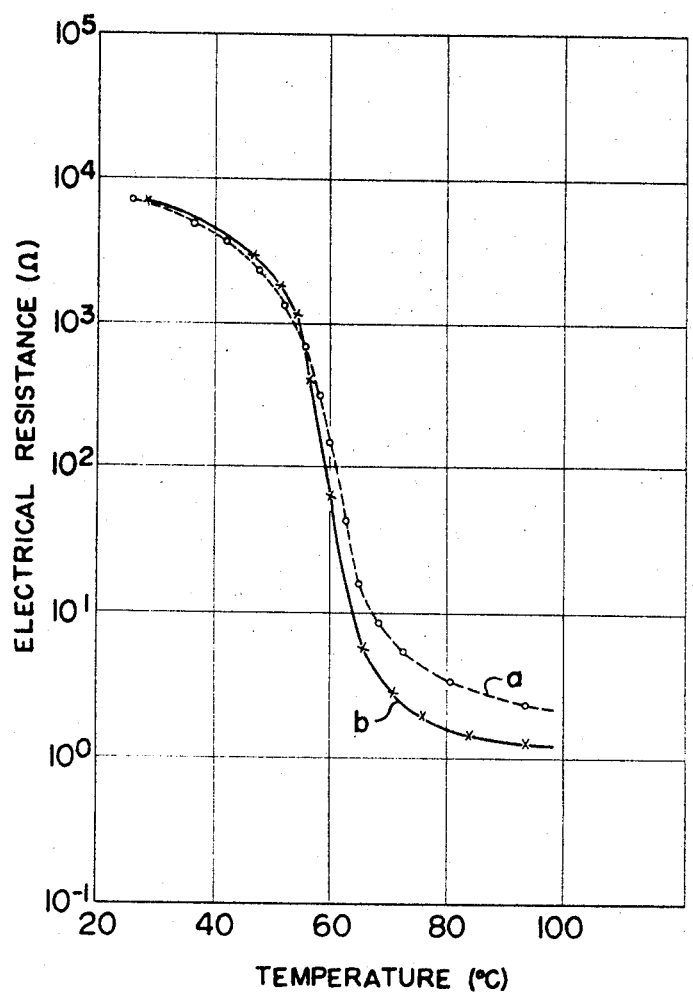

| Material Composition | Tc (° C.) | $\psi$ | Characteristic curves shown in— |
|---|---|---|---|
| $V_{7.0}$, $Fe_{0.5}$, $P_{1.0}$, $Sr_{1.5}$ | 61 | 2.9 | Fig. 15a. |
| $V_{7.0}$, $Fe_{0.5}$, $P_{1.0}$, $Pb_{0.5}$, $Sr_{1.0}$ | 61 | 3.0 | Fig. 15b. |

As is clear from this example, Tc of the negative abruptly changing resistor having an oxide of Fe as a component of its material composition is shifted into the lower-temperature region.

Figure 16:
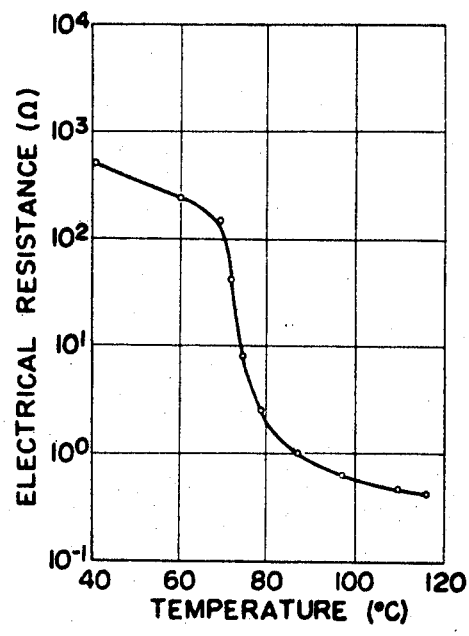

Example 3.—FIG. 16 shows the temperature-resistance characteristic of a negative abruptly changing resistor of bead form which was made according to exactly the same manufacturing conditions as in Example 2 through thoroughly mixing by weight ratio 1:1 a material composition of V:Fe:P=6:2:2 and another composition of V:Ge:P=8:1:1. Further, lattice constants at room temperature are shown in Table 9.

TABLE 9

| Material Composition | $a_0$(A.) | $b_0$(A.) | $c_0$(A.) | $\beta$ (deg.) | Tc (° C.) |
|---|---|---|---|---|---|
| $(V_6, Fe_2, P_2)_1 + (V_8, Ge_1, P_1)_1$ | 5.75 | 5.52 | 5.35 | 122.5 | 72 |

As mentioned in Example 1 and 2, $V_8$, $Ge_1$, $P_1$ is a material composition, the Tc of which shifts in the higher-temperature region, and $V_6$, $Fe_2$, $P_2$ is another composition the Tc of which shifts to the lower-temperature region. When these two compositions are mixed by weight ratio 1:1, the Tc of the resulting negative abruptly changing resistor is 72° C., that is, a temperature which lies midway between those of said two compositions, and the lattice constant of said resulting resistor is relatively close to that of $VO_2$.

Figure 17:
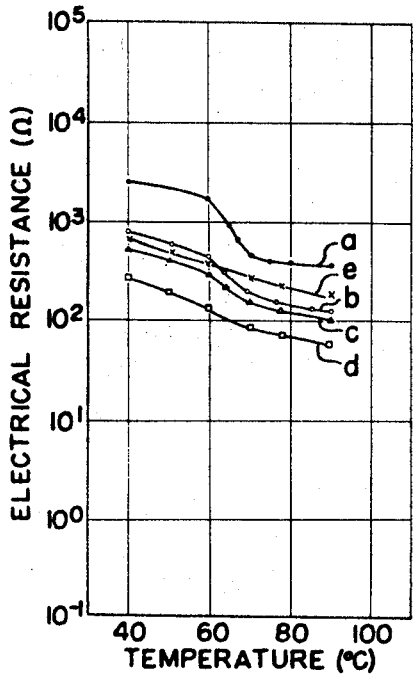

Example 4.—FIG. 17 shows the characteristics of negative abruptly changing resistors of bead form, which were produced, according to exactly the same manufacturing conditions as in Example 2, by measuring and thoroughly mixing vanadium pentoxide $V_2O_5$ and tetracobalt trioxide $Co_3O_4$ in order to produce the material composition shown in Table 10.

TABLE 10

| Material Composition | Tc (° C.) | ψ | Characteristic curves shown in— |
|---|---|---|---|
| $V_9$, $Co_1$ | 65 | 0.70 | Fig. 17a. |
| $V_8$, $Co_2$ | 65 | 0.35 | Fig. 17b. |
| $V_7$, $Co_3$ | 65 | 0.20 | Fig. 17c. |
| $V_6$, $Co_4$ | | | Fig. 17d. |
| $V_5$, $Co_5$ | | | Fig. 17e. |

As is clear from FIG. 17, a negative abruptly changing resistor having Co of over 40% loses its abruptly changing characteristic of resistance corresponding to the temperature. The reason for this is thought to be that surplus oxides of Co are connected in series and in parallel with fine grains of crystals of $VO_2$ playing the main role of said resistor and shut out the abruptly changing characteristic of $VO_2$ itself.

Table 11 shows the characteristics of negative abruptly changing resistors having the material composition of $V_2O_5$, $Co_3O_4$ and $(NH_4)_2HPO_4$. The manufacturing conditions are the same as those of the two systems of $V_2O_5$, $Co_3O_4$.

TABLE 11

Figure 18:
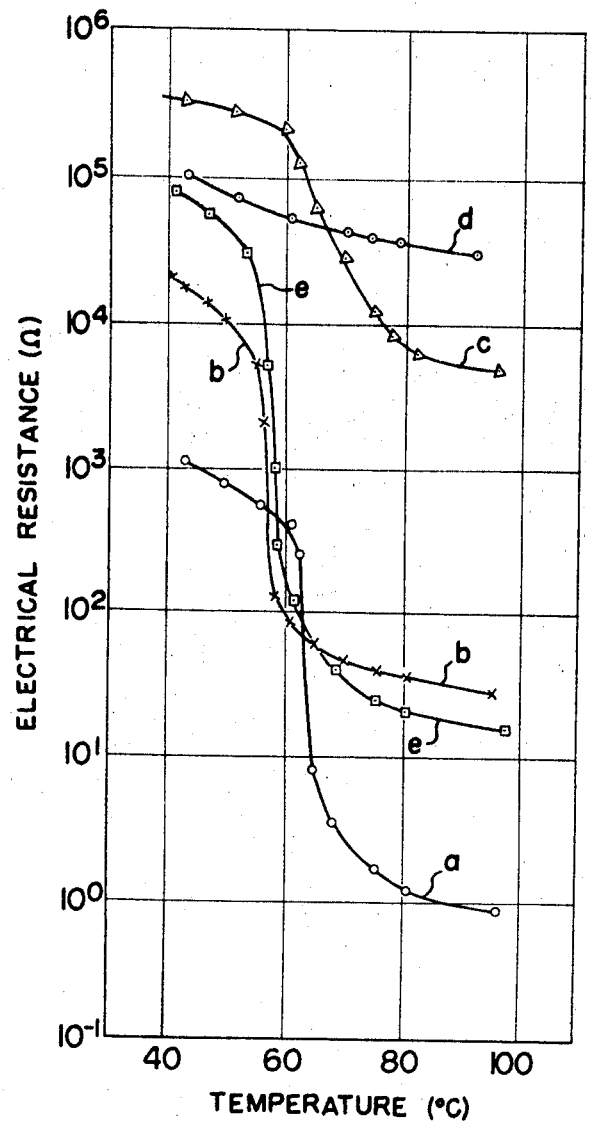

| Material Composition | Tc (° C.) | ψ | Characteristic curves shown in— |
|---|---|---|---|
| $V_8$, $Co_1$, $P_1$ | 65 | 2.4 | Fig. 18a. |
| $V_7$, $Co_2$, $P_1$ | 57 | 2.1 | Fig. 18b. |
| $V_6$, $Co_3$, $P_1$ | 70 | 1.4 | Fig. 18c. |
| $V_5$, $Co_4$, $P_1$ | | 0 | Fig. 18d. |
| $V_5$, $Co_3$, $P_2$ | 58 | 3.0 | Fig. 18e. |

The ψ of a negative abruptly changing resistor having material composition of the 3-component system is larger than that of a resistor having a composition of the 2-component system.

Table 12 shows the characteristics of negative abruptly changing resistors having as their material composition $V_2O_5$, $Co_3O_4$ and $SrCO_3$.

TABLE 12

| Material Composition | Tc (° C.) | ψ | Characteristic curves shown in— |
|---|---|---|---|
| $V_8$, $Co_1$, $Sr_1$ | 57 | 2.6 | Fig. 19a. |
| $V_7$, $Co_2$, $Sr_1$ | 58 | 3.1 | Fig. 19b. |
| $V_6$, $Co_3$, $Sr_1$ | 65 | 3.5 | Fig. 19c. |
| $V_7$, $Co_1$, $Sr_2$ | 58 | 3.2 | Fig. 19d. |

Figure 19:
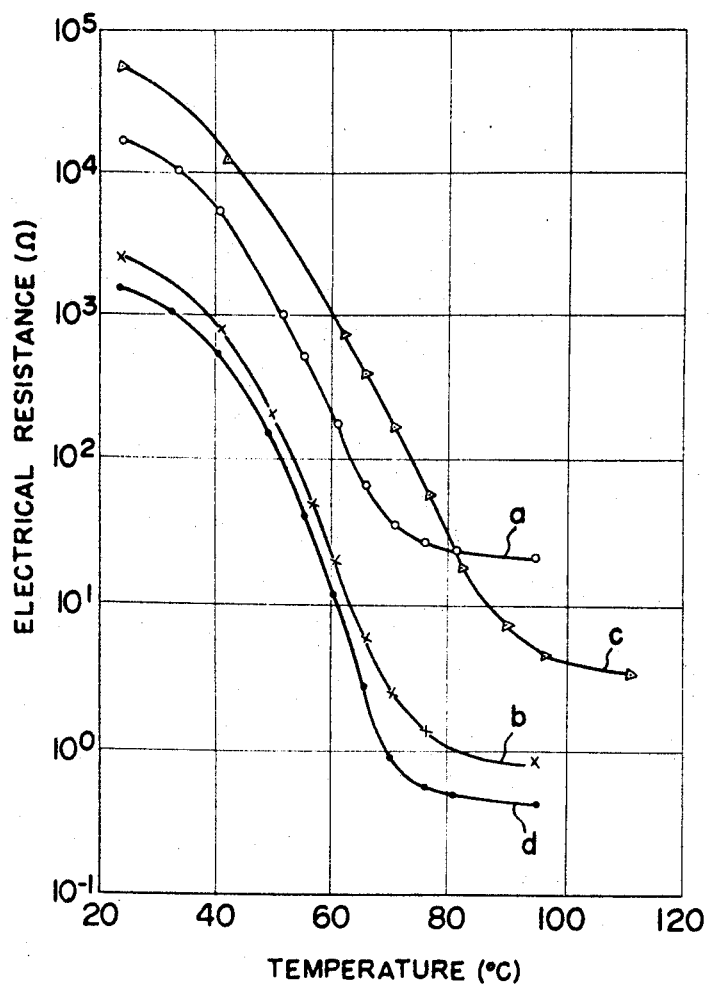

The characteristic of said resistors is, as is clear from FIG. 19, such that their temperature coefficients of resistance are nearly constant in wide range of temperatures, that is, from 40°C. to 75°C. and from 40°C. to 95°C., as in the case of an ordinary thermistor.

The Tc of the negative abruptly changing resistor which was produced from a material composition having a component of an oxide of Co as mentioned above is shifted to the lower-temperature region.

Figure 20:
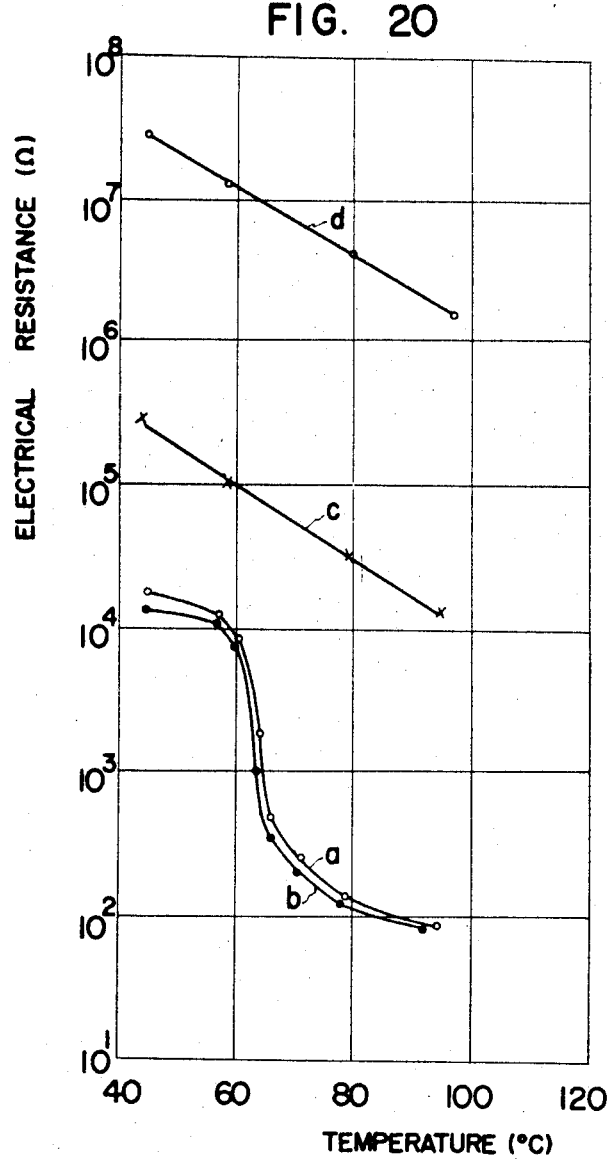

Example 5.—Table 13 and FIG. 20 show the characteristics of negative abruptly changing resistors which were produced from material compositions of vanadium pentoxide $V_2O_5$ and manganese dioxide $MnO_2$, according to the process indicated in FIG. 3, the reduction temperature and time being 400°C. and 120 minutes in step 5 of FIG. 3, and other manufacturing conditions being exactly the same as in Example 1.

TABLE 13

| Material Composition | Tc (° C.) | ψ | Characteristic curves shown in— |
|---|---|---|---|
| $V_9$, $Mn_1$ | 64 | 2.8 | Fig. 20a. |
| $V_8$, $Mn_2$ | 64 | 2.8 | Fig. 20b. |
| $V_7$, $Mn_3$ | | | Fig. 20c. |
| $V_6$, $Mn_4$ | | | Fig. 20d. |

As is clear from FIG. 20, when the added quantity of $MnO_2$ is defined in such a manner that Mn is over 30%, said resistors show the same characteristic as that of an ordinary thermistor.

Table 14 show the characteristic of negative abruptly changing resistors which were produced from $V_2O_5$, $MnO_2$, $(NH_4)_2HPO_4$ on the one hand and $V_2O_5$, $MnO_2$, $SrCO_3$ on the other hand. However, the reduction temperature and time of said latter resistors are 350°C. and 30 minutes, respectively, and the manufacturing conditions of $V_2O_5$, $MnO_2$, $SrCO_3$ are the same as those of the 2-component system.

TABLE 14

| Material Composition | Tc (° C.) | ψ | Characteristic curves shown in— |
|---|---|---|---|
| $V_{8.5}$, $Mn_{0.5}$, $P_{1.0}$ | 66 | 3.1 | Fig. 21a. |
| $V_{8.0}$, $Mn_{1.0}$, $P_{1.0}$ | 67 | 2.3 | Fig. 21b. |
| $V_{7.0}$, $Mn_{2.0}$, $P_{1.0}$ | 63 | 0.4 | Fig. 21c. |
| $V_{8.0}$, $Mn_{1.0}$, $Sr_{1.0}$ | 65 | 2.7 | Fig. 21d. |
| $V_{8.0}$, $Mn_{3.0}$, $Sr_{1.0}$ | | | Fig. 21e. |
| $V_{7.0}$, $Mn_{1.0}$, $Sr_{2.0}$ | 64 | 2.6 | Fig. 21f. |

Figure 21:
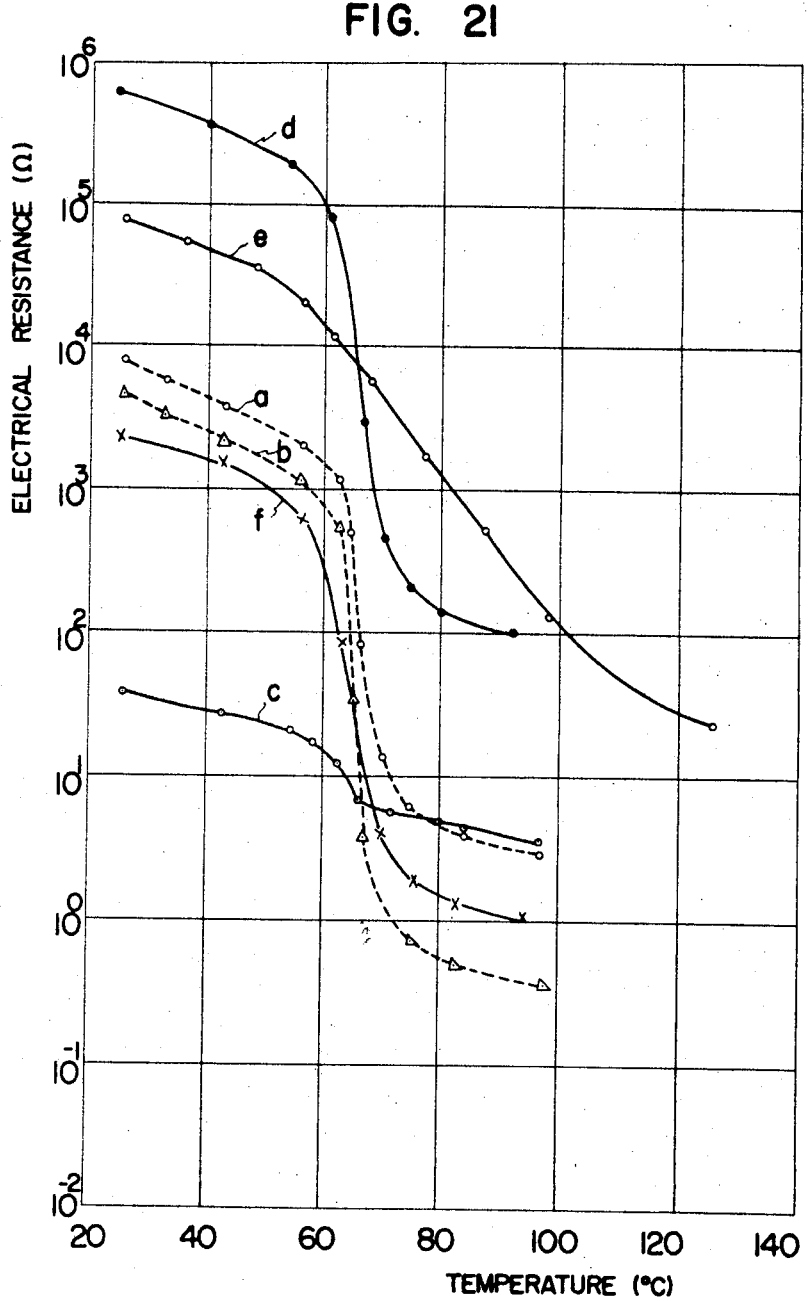

As is clear from FIG. 21, when Mn is over 30%, the temperature co-efficient of resistance is nearly constant, that is, about—40%/deg., in the range of temperature of 40° C. 110° C. This coincides with the fact that a negative abruptly changing resistor of the 2-component system of $V_2O_5$, $MnO_2$ has the same characteristic as that of an ordinary thermistor when Mn is over 30%.

Figure 22:
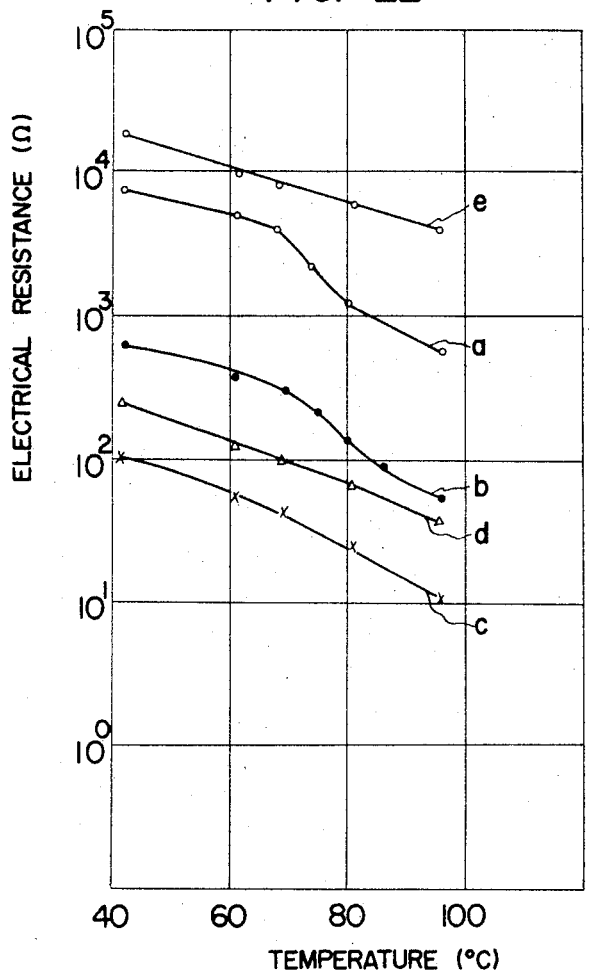

Example 6.—Table 15 and FIG. 22 show the characteristics of negative abruptly changing resistors which were produced from material compositions of vanadium pentoxide $V_2O_5$ and titanium dioxide $TiO_2$, the reduction temperature and time of step 5 of FIG. 3 being 400° C. and 120 minutes, respectively, and other manufacturing conditions being the same as those of Example 1.

TABLE 15

| Material Composition | Tc (° C.) | ψ | Characteristic curves shown in— |
|---|---|---|---|
| $V_9$, $Ti_1$ | 75 | 0.5 | Fig. 22a. |
| $V_8$, $Ti_2$ | 75 | 0.3 | Fig. 22b. |
| $V_7$, $Ti_3$ | | | Fig. 22c. |
| $V_6$, $Ti_4$ | | | Fig. 22d. |
| $V_5$, $Ti_5$ | | | Fig. 22e. |

As is clear from FIG. 22, Tc is shifted to the higher-temperature region, and when Ti is over 30%, said resistors do not show the abruptly changing characteristic.

Figure 23:
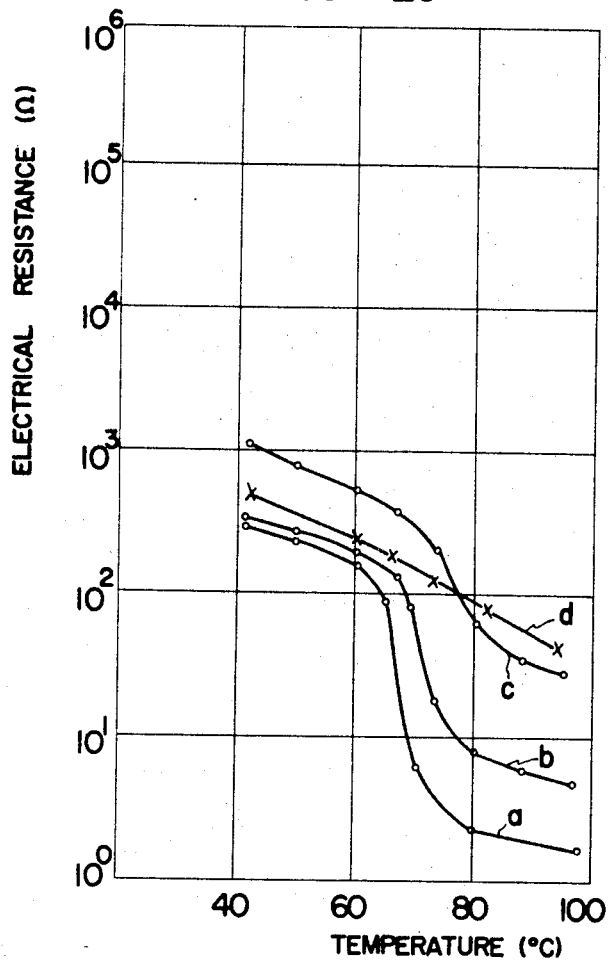

Table 16 and FIG. 23 show the characteristics of negative abruptly changing resistors having as material composition of the 3-component system of $V_2O_5$, $TiO_2$, $(NH_4)_2HPO_4$.

TABLE 16

| Material Composition | Tc (° C.) | ψ | Characteristic curves shown in— |
|---|---|---|---|
| $V_{8.5}$, $Ti_{0.5}$, $P_{1.0}$ | 68 | 1.7 | Fig. 23a. |
| $V_{8.0}$, $Ti_{1.0}$, $P_{1.0}$ | 72 | 1.2 | Fig. 23b. |
| $V_{7.0}$, $Ti_{2.0}$, $P_{1.0}$ | 78 | 0.8 | Fig. 23c. |
| $V_{6.0}$, $Ti_{3.0}$, $P_{1.0}$ | | | Fig. 23d. |

When Ti is over 30%, said resistor loses the abruptly changing characteristic as in the case of the 2-component system, and has the same characteristic as that of an ordinary thermistor.

The Tc of the negative abruptly changing resistor into which an oxide of Ti is added as mentioned above is shifted into the higher-temperature region.

Figure 24:
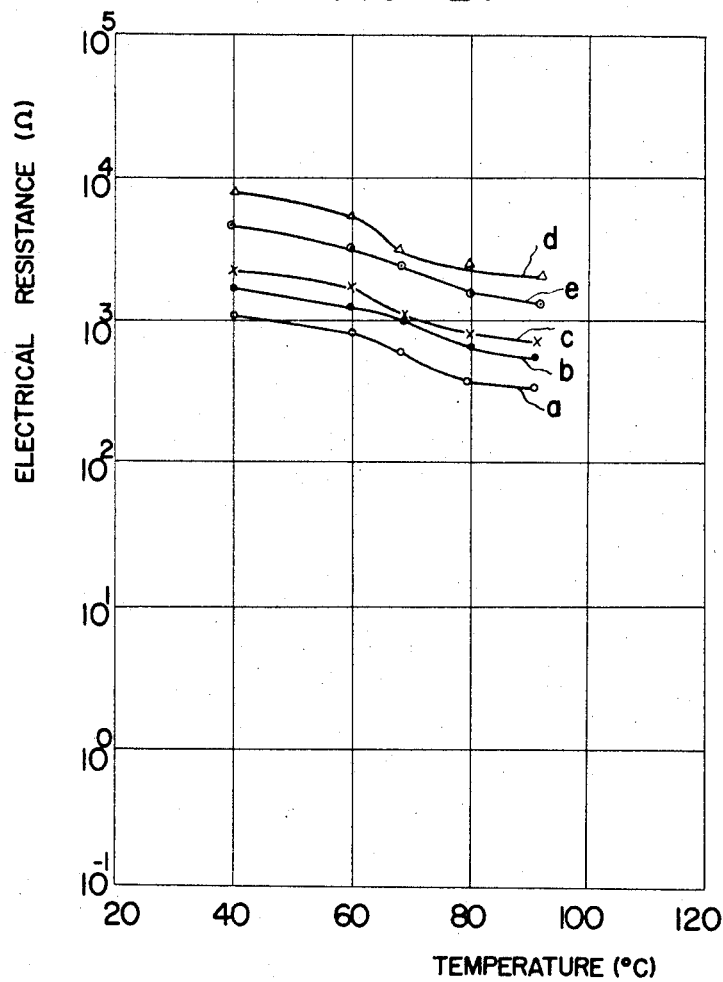

Example 7.—Table 17 and FIG. 24 show the characteristics of negative abruptly changing resistors which were produced from a material composition of vanadium pentoxide $V_2O_5$ and nickel oxide NiO, according to the process of FIG. 3, under the same manufacturing conditions as those of Example 2.

TABLE 17

| Material Composition | Tc (° C.) | ψ | Characteristic curves shown in— |
|---|---|---|---|
| $V_9$, $Ni_1$ | ≃65 | 0.2 | Fig. 24a. |
| $V_8$, $Ni_2$ | ≃65 | 0.05 | Fig. 24b. |
| $V_7$, $Ni_3$ | ≃65 | 0.1 | Fig. 24c. |
| $V_6$, $Ni_4$ | ≃65 | 0.2 | Fig. 24d. |
| $V_5$, $Ni_5$ | ≃55 | 0.05 | Fig. 24e. |

Figure 25:
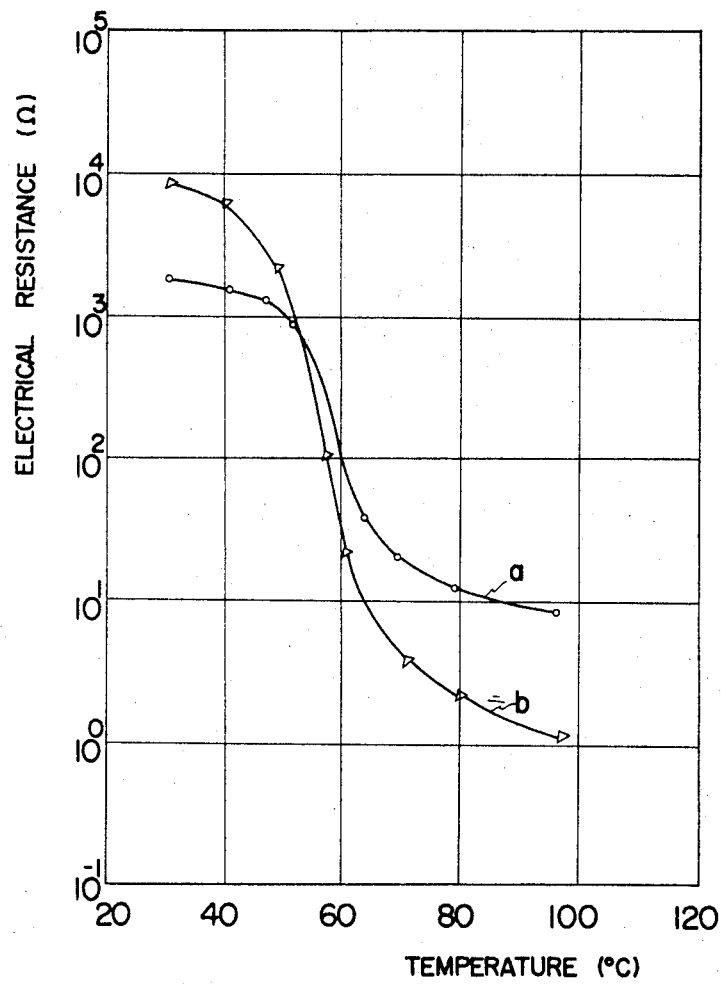

Further, Table 18 and FIG. 25 show the characteristics of negative abruptly changing resistors which were produced from a material composition of $V_2O_5$, NiO, $SrCO_3$ and $V_2O_5$, NiO, $(NH_4)_2HPO_4$, the reduction temperature and time of step 5 being 350° C. and 30 minutes, respectively.

TABLE 18

| Material Composition | Tc (° C.) | ψ | Characteristic curves shown in— |
|---|---|---|---|
| $V_6$, $Ni_3$, $P_1$ | 59 | 2.0 | Fig. 25a. |
| $V_6$, $Ni_2$, $Sr_2$ | 57 | 3.1 | Fig. 25b. |

As is clear from this example, the Tc of the negative abruptly changing resistor with an oxide of Ni added thereto is shifted into the lower-temperature region.

Figure 26:
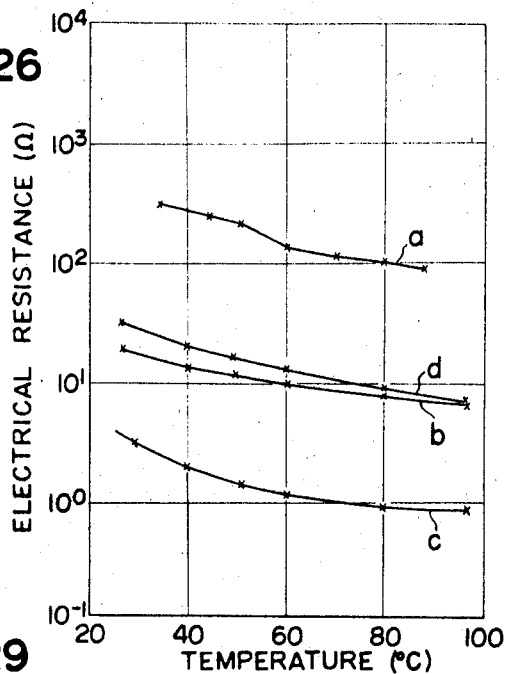

Example 8.—We have produced negative abruptly changing resistors of bead form, according to the same manufacturing conditions as those of Example 1, starting from a material composition of the 2-component system of $V_2O_5$ and $Nb_2O_5$. The results of said resistors are shown in Table 19 and FIG. 26.

Further, Table 20 shows the characteristics of negative abruptly changing resistors of bead form which were produced from a material composition containing as the third component $(NH_4)_2HPO_4$ and $SrCO_3$.

TABLE 19

| Material Composition | Tc (° C.) | ψ | Characteristic curves shown in— |
|---|---|---|---|
| $V_{9.9}$, $Nb_{0.1}$ | ≃55 | 0.2 | Fig. 26a. |
| $V_{9.5}$, $Nb_{0.5}$ | | | Fig. 26b. |
| $V_{9.0}$, $Nb_{1.0}$ | | | Fig. 26c. |
| $V_{8.0}$, $Nb_{2.0}$ | | | Fig. 26d. |

TABLE 20

| Material Composition | Tc (° C.) | ψ | Characteristic curves shown in— |
|---|---|---|---|
| $V_{8.9}$, $Nb_{0.1}$, $P_{1.0}$ | 58 | 1.2 | Fig. 27a. |
| $V_{8.7}$, $Nb_{0.3}$, $P_{1.0}$ | 50 | 1.2 | Fig. 27b. |
| $V_{8.5}$, $Nb_{0.5}$, $P_{1.0}$ | 25 | 1.0 | Fig. 27c. |
| $V_{8.0}$, $Nb_{1.0}$, $P_{1.0}$ | | | Fig. 27d. |
| $V_{8.9}$, $Nb_{0.10}$, $Sr_{1.0}$ | ≃60 | 0.4 | Fig. 28a. |
| $V_{8.7}$, $Nb_{0.3}$, $Sr_{1.0}$ | ≃20 | 1.1 | Fig. 28b. |
| $V_{8.5}$, $Nb_{0.5}$, $Sr_{1.0}$ | ≃10 | 0.7 | Fig. 28c. |
| $V_{8.0}$, $Nb_{1.0}$, $Sr_{1.0}$ | | | Fig. 28d. |

Figure 27:
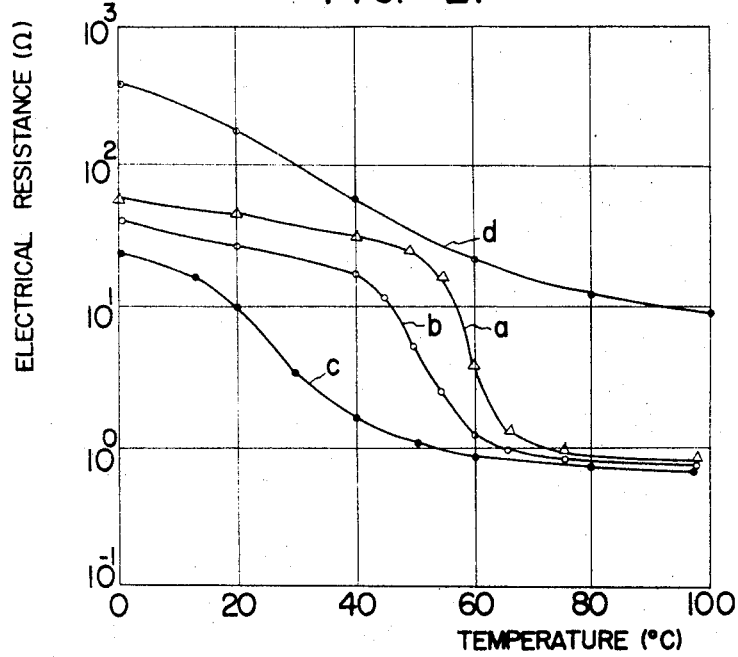
Figure 28:
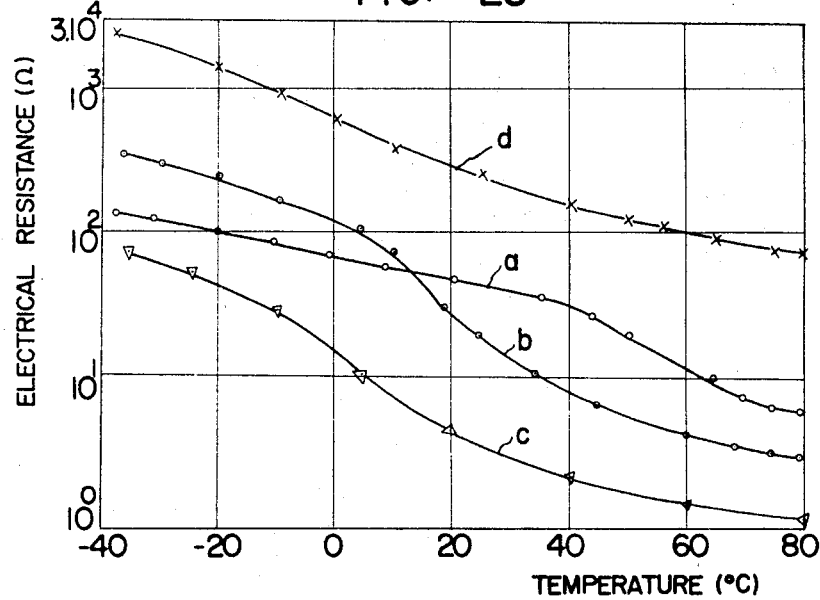

As is clear from FIGS. 27 and 28, the value of ψ increases with the addition of oxides of P and Sr. With the increase of the quantity of oxides of Nb, the value of ψ decreases. A suitable added quantity of oxides of Nb which is restricted by the value of ψ is such that Nb is less than 10%.

Table 21 shows the characteristics of negative abruptly changing resistors which have as a part of their material composition $WO_3$, $MoO_3$, $Ta_2O_5$, and which were produced according to the process of FIG. 3. However, when $Ta_2O_5$ was used as a part of the material composition, the reduction temperature and time of step 5 of FIG. 3 were 400° C. and 30 minutes respectively. Further, when the three components of $V_2O_5$, $MoO_3$, $SrCO_3$ were used in the material compositions, said temperature and time were 400° C. and 120 minutes, respectively.

TABLE 21

Figure 29:
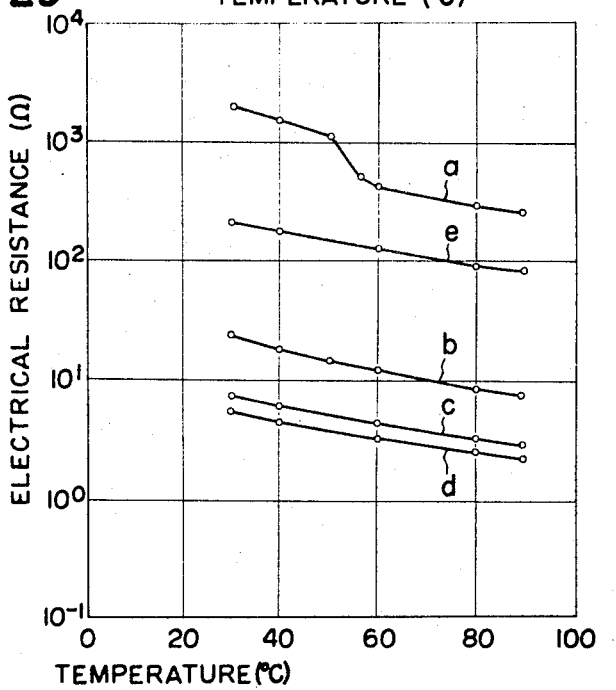
Figure 30:
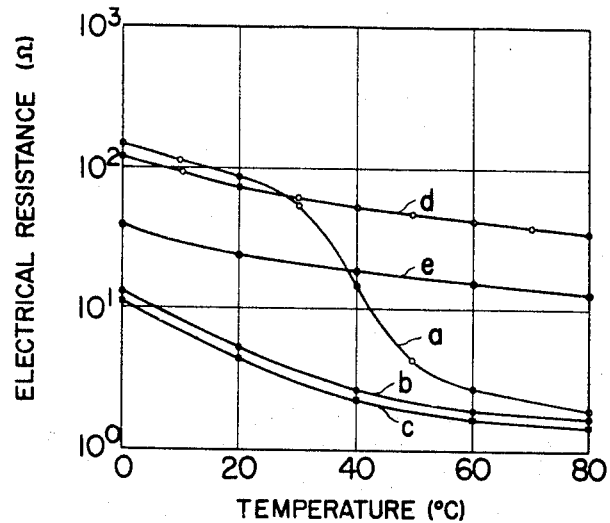
Figure 31:
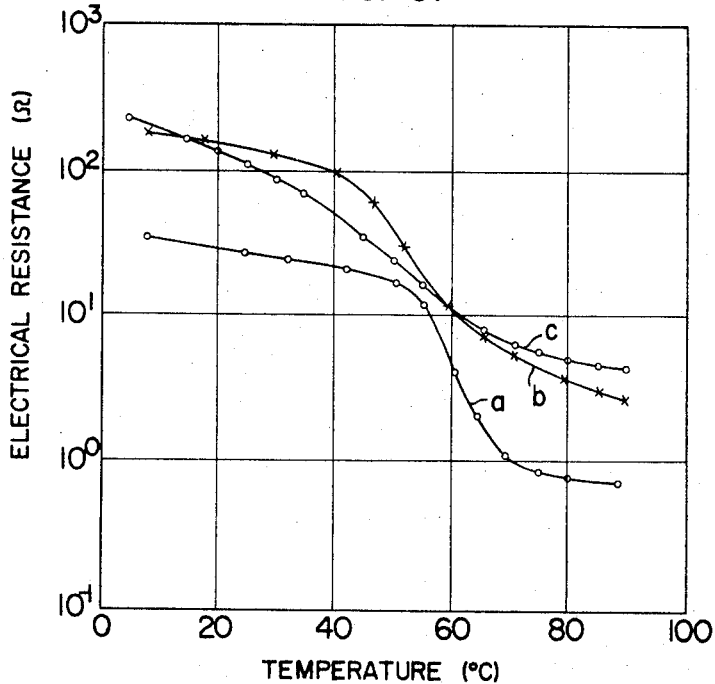
Figure 32:
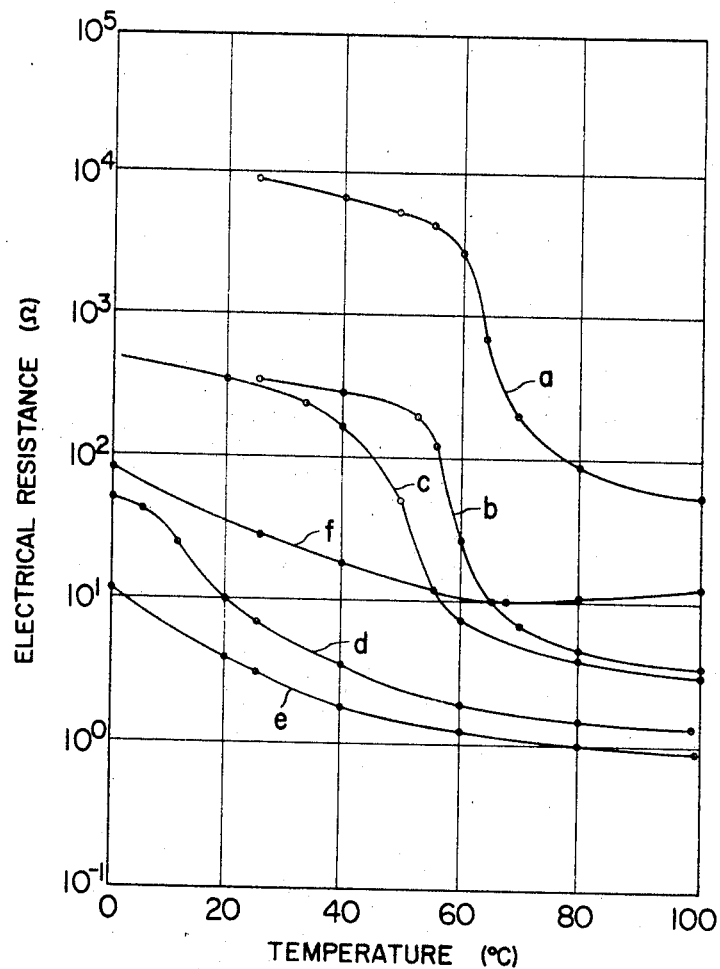
Figure 33:
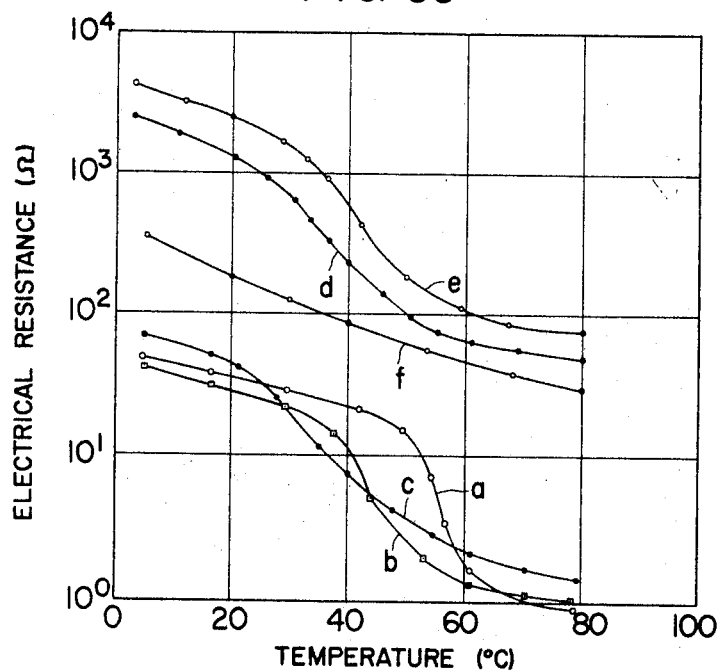
Figure 34:
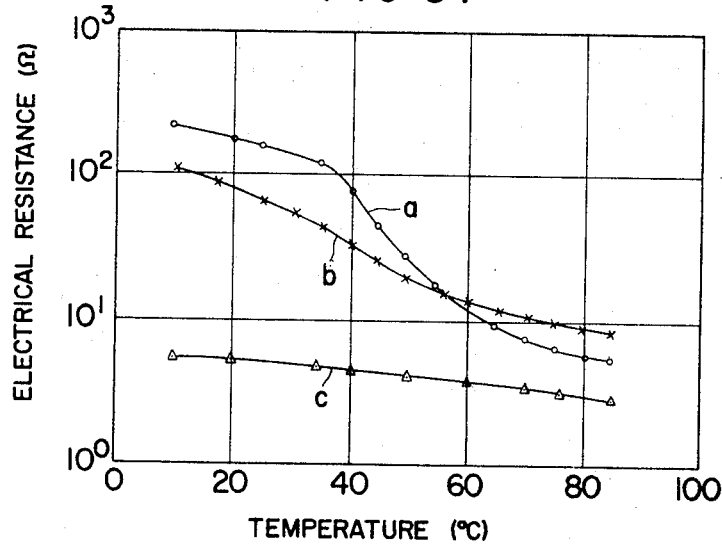

| Material Composition | Tc (° C.) | ψ | Characteristic curves shown in— |
|---|---|---|---|
| $V_{9.9}$, $W_{0.1}$ | 55 | 0.4 | Fig. 29a. |
| $V_{9.7}$, $W_{0.3}$ | | | Fig. 29b. |
| $V_{9.5}$, $W_{0.5}$ | | | Fig. 29c. |
| $V_{8.0}$, $W_{2.0}$ | | | Fig. 29d. |
| $V_{8.9}$, $W_{0.1}$, $P_{1.0}$ | 40 | 1.2 | Fig. 30a. |
| $V_{8.7}$, $W_{0.3}$, $P_{1.0}$ | | | Fig. 30b. |
| $V_{8.5}$, $W_{0.5}$, $P_{1.0}$ | | | Fig. 30c. |
| $V_{8.25}$, $W_{0.75}$, $P_{1.0}$ | | | Fig. 30d. |
| $V_{7.0}$, $W_{2.0}$, $P_{1.0}$ | | | Fig. 30e. |
| $V_{8.9}$, $Mo_{0.1}$, $Sr_{1.0}$ | 60 | 1.3 | Fig. 31a. |
| $V_{8.5}$, $Mo_{0.5}$, $Sr_{1.0}$ | ≃55 | 1.1 | Fig. 31b. |
| $V_{8.0}$, $Mo_{1.0}$, $Sr_{1.0}$ | ≃50 | 1.0 | Fig. 31c. |
| $V_{8.9}$, $Mo_{0.1}$, $P_{1.0}$ | 65 | 1.6 | Fig. 32a. |
| $V_{8.7}$, $Mo_{0.3}$, $P_{1.0}$ | 59 | 1.5 | Fig. 32b. |
| $V_{8.5}$, $Mo_{0.3}$, $P_{1.0}$ | 51 | 1.4 | Fig. 32c. |
| $V_{8.25}$, $Mo_{0.75}$, $P_{1.0}$ | ≃20 | 1.0 | Fig. 32d. |
| $V_{8.0}$, $Mo_{1.0}$, $P_{1.0}$ | | | Fig. 32e. |
| $V_{7.0}$, $Mo_{2.0}$, $P_{1.0}$ | | | Fig. 32f. |
| $V_{8.9}$, $Ta_{0.1}$, $P_{1.0}$ | 56 | 1.2 | Fig. 33a. |
| $V_{8.7}$, $Ta_{0.3}$, $P_{1.0}$ | 46 | 1.0 | Fig. 33b. |
| $V_{8.5}$, $Ta_{0.5}$, $P_{1.0}$ | ≃40 | 1.2 | Fig. 33c. |
| $V_{8.25}$, $Ta_{0.75}$, $P_{1.0}$ | ≃40 | 1.2 | Fig. 33d. |
| $V_{8.0}$, $Ta_{1.0}$, $P_{1.0}$ | ≃40 | 1.2 | Fig. 33e. |
| $V_{7.0}$, $Ta_{2.0}$, $P_{1.0}$ | | | Fig. 33f. |
| $V_{8.9}$, $Ta_{0.1}$, $Sr_{1.0}$ | | | Fig. 34a. |
| $V_{8.7}$, $Ta_{0.3}$, $Sr_{1.0}$ | | | Fig. 34b. |
| $V_{8.5}$, $Ta_{0.5}$, $Sr_{1.0}$ | | | Fig. 34c. |

As is clear from the above example, the negative abruptly changing resistors which were produced from oxides of Nb, W, Mo and Ta as components of the material composition have an abruptly changing temperature Tc that is shifted to the lower-temperature region in comparison with that of heretofore used resistors.

Example 9.—Table 22 shows the characteristics of negative abruptly changing resistors which were produced from a material composition of vanadium pentoxide $V_2O_5$, chromium trioxide $Cr_2O_3$, diammonium hydrogen phosphate $(NH_4)_2HPO_4$, strontium carbonate $SrCO_3$ and lead oxide PbO, the reduction temperature and time of step 5 shown in FIG. 3 being 400° C. and 120 minutes, respectively, and other manufacturing conditions being the same as those of Example 1.

TABLE 22

| Material Composition | Tc (° C.) | ψ | Characteristic curves shown in— |
|---|---|---|---|
| $V_9$, $Cr_1$ | 64 | 3.0 | Fig. 35a. |
| $V_8$, $Cr_1$, $P_1$ | 72 | 1.0 | Fig. 35b. |
| $V_7$, $Cr_2$, $P_1$ | 64 | 0.5 | Fig. 35c. |
| $V_7$, $Cr_1$, $Sr_2$ | 71 | 1.2 | Fig. 35d. |
| $V_7$, $Cr_2$, $Sr_1$ | 78 | 1.2 | Fig. 35e. |
| $V_6$, $Cr_1$, $Pb_3$ | 75 | 1.8 | Fig. 35f. |
| $V_6$, $Cr_2$, $Pb_2$ | 74 | 0.5 | Fig. 35g. |

As is clear from FIG. 35, in the 2-component system of $V_9$, $Cr_1$, the Tc is shifted into the lower-temperature region. However, in a material composition of the 3-component system containing as the third component oxides of P, Sr, and Pb, Tc shifts into the higher-temperature region, and the range of the resistance abruptly changing temperature is greater than that of a 2-component system of $V_9$, $Cr_1$. The reason therefor is that oxides of Cr shift, in principle, Tc into the lower-temperature region because of the valence of the Cr atom, whereas the oxides of P, Sr and Pb added as the third component decrease ψ, whereby the characteristics of said resistors become similar to that of an ordinary thermistor, which results in apparent shifting of Tc into the higher-temperature region.

The above-mentioned examples relate to bead type resistors, but it is possible to obtain the same temperature-resistance characteristic as those of the Examples 1–9 even when the resistor is formed as thin film type, rod type or disc type structure according to necessity. For example, in the case of thin film type or rod type structure, the resistor can be prepared in the following manner. That is, a molten mixture having such composition mixing ratio as described in any one of the Examples 1 to 9 is prepared according to process steps 1, 2 and 3 indicated in FIG. 3, and then said molten mixture is subjected to cooling on a thin film or wire. In this case, the thin film element is formed by the same technique as in the manual blowing method which is well known in the glass working technique. The compound oxide on said thin film or wire is subjected to reduction treatment according to the same conditions such as reductive gas, reduction temperature and reduction period of time as the conditions adopted in the Examples 1 to 9. Then, the product is subjected to sintering for three minutes at a temperature of 1000° C. and to cooling as it is. The thin film or wire which has been subjected to reduction and sintering is divided into a plurality of resistors each of which is connected with its electrode-leadwires, whereby resistors the electric negative resistance of which varies abruptly are obtained. On the other hand, any disc type resistor can be obtained by subjecting powder of a compound oxide obtained by the process steps 1, 2, 3 and 4 of FIG. 3 to molding under pressure, and then subjecting the molded product to reduction treatment and sintering.

According to the present invention, the abruptly varying electrical negative resistance of the resistor can be controlled by additionally mixing therein, beside the first, second and third oxide components, an electrically insulating oxide such as silicon dioxide ($SiO_2$) which is difficult to combine chemically with vanadium oxide or any other inorganic, electrically insulating material.

As is clear from the above examples, for shifting the Tc of a negative abruptly changing resistor into a region lower or higher than the usual Tc ($\simeq$68° C.), it is sufficient to add as a component of material composition at least one of the oxides of Fe, Co, Ni, Mn, Nb, W, Mo and Ta or at least one of the oxides of Ge and Ti, respectively.

Thus, by the negative abruptly changing resistor according to this invention, it is possible to shift at will between 25° C.–80° C. the abruptly changing temperature at which negative resistance abruptly appears. Consequently, it is now possible to extend the scope of applications of said resistor to temperature-controlling devices, temperature-alarming devices, fire-alarms, thermometers and so on which are used in said range of temperature. Furthermore, the practical application of the resistor of this invention is quite easy, because there is no need of any outer effect such as application of pressure of several tens of kilobars which is technically and mechanically complicated and difficult to practice.

What we claim is:

1. An electric resistor which contains at least two mutually separated electrodes, a crystal of vanadium dioxide included therein, at least one element selected from the group consisting of germanium, iron, cobalt, nickel, manganese, titanium, niobium, tungsten, molybdenum, tantalum, and chromium in the state of solid-solution.

2. An electric resistor which contains at least two mutually separated electrodes, a crystal of vanadium dioxide included therein, at least one element of germanium and titanium, at least one kind being made to exist in the crystals of said vanadium in the state of solid-solution, and means for electrically connecting said crystal to said electrodes, whereby the temperature range at which electrical resistance of said resistor varies abruptly is moved to the range higher than the temperature range at which natural electric resistance of the crystal of the vanadium dioxide varies abruply.

3. An electric resistor which contains at least two mutually separated electrodes, a crystal of vanadium dioxide included therein, at least one element selected from the group consisting of iron, cobalt, nickel, manganese, niobium, tungsten, molybdenum, and tantalum, in the state of solid-solution, and means for electrically connecting said crystal to said electrodes, whereby the temperature range at which electrical resistance of the resistor varies abruptly is moved to the range lower than the temperature range at which natural electric resistance of the crystal of the vanadium dioxide varies abruply.

4. An electric resistor which comprising at least two electrodes which are apart from each other, fine grains of vanadium dioxide crystal, a sintered member made of a compound oxide containing vanadium oxide other than said vanadium dioxide crystal and an oxide of at least one element selected from the group consisting of germanium, iron, cobalt, nickel, manganese, titanium, niobium, tungsten, molybdenum, tantalum, and chromium, said sintered member enclosing said fine grains of crystal to connect to said electrodes, at least one of said elements in said fine grains of crystal being in the state of solid solution.

5. An electric resistor comprising: a body composed substantially of fine grains of crystal of vanadium dioxide, containing therein at least one element selected from the group consisting of germanium, iron, cobalt, nickel, manganese, titanium, niobium, tungsten, molybdenum, tantalum, and chromium in the state of solid-solution; and a vitrefied oxide substance enclosing said fine grains of crystal; and a plurality of electrode means electrically connected to said body.

6. The electric resistor according to claim 5, wherein said oxide substance includes vanadium oxide other than said fine grains of crystal of vanadium dioxide, the total quantity of the gram atomic weight of the vanadium included in said fine grains of crystal and said oxide member being not less than 50% of the total quantity of the gram atomic weight of the metallic elements included in said fine grains of crystal and said oxide substance.

7. An electric resistor comprising: a body composed substantially of the fine grains of crystal of vanadium dioxide, containing therein at least one element selected from the first group consisting of germanium, iron, cobalt, nickel, manganese, titanium, niobium, tungsten, molybdenum, tantalum, and chromium in the state of solid-solution; and an oxide substance enclosing said find grains of crystal, said oxide substance including an oxide of at least one element selected from the second group consisting of magnesium, calcium, barium, strontium, lead, lanthanum, phosphorus, boron, silicon, tellurium, uranium, and sodium; and a plurality of electrode means electrically connected to said body.

8. The electric resistor according to claim 7, wherein the gram atomic weight of said elements selected from said second group is not more than 40% of the total quantity of the gram atomic weight of the metallic elements included in said fine grains of crystal and said oxide substance.

9. The electric resistor according to claim 7, wherein said oxide substance includes a vanadium oxide other than said fine grains of crystal of vanadium dioxide, the total quantity of the gram atomic weight of the vanadium included in said fine grains of crystal and said oxide substance being not less than 50% of the total quantity of the gram atomic weight of the metallic elements included in said fine grains of crystals and said oxide substance.

10. The electric resistor according to claim 9, wherein said oxide substance further includes an oxide of at least one element selected from said first group.

11. An electric resistor comprising: a body composed substantially of fine grains of crystal of vanadium dioxide, containing therein germanium in the state of solid-solution; and an oxide substance enclosing said fine grains of crystal; and a plurality of electrode means electrically connected to said body.

12. The electric resistor according to claim 11, wherein said oxide substance includes germanium oxide, the total quantity of the gram atomic weight of the germanium included in said fine grains of crystal and said oxide substance being not more than 40% of the total quantity of the gram atomic weight of metallic elements included in said grains of crystal and said oxide substance.

13. The electric resistor according to claim 12, wherein said oxide substance further includes an oxide of at least one element selected from the group consisting of magnesium, calcium, barium, strontium, lead, lanthanum, phosphorus, boron, silicon, tellurium, uranium, and sodium.

14. The electric resistor according to claim 14, wherein said oxide substance further includes silver oxide.

15. An electric resistor comprising: a body composed substantially of fine grains of crystal of vanadium dioxide, containing therein iron in the state of solid-solution; and an oxide substance enclosing said fine grains of crystal; and a plurality of electrode means electrically connected to said body.

16. The electric resistor according to claim 15, wherein said oxide substance includes iron oxide, the total quantity of the gram atomic weight of the iron included in said fine grains of crystal and said oxide member being not more than 25% of the total quantity of the gram atomic weight of metallic elements included in said fine grains of crystal and said oxide substance.

17. The electric resistor according to claim 15, wherein said oxide substance includes iron oxide and an oxide of at least one element selected from the group consisting of magnesium, calcium, barium, strontium, lead, lanthanum, phosphorus, boron, silicon, tellurium, uranium, and sodium, the total quantity of the gram atomic weight of the iron included in said fine grains of crystal and said oxide substance being not more than 40% of the total quantity of the gram atomic weight of metallic elements included in said fine grains of crystal and said oxide substance.

18. An electric resistor comprising: a body composed substantially of fine grains of crystal of vanadium dioxide, containing therein cobalt in the state of solid-solution; and an oxide substance enclosing said fine grains of crystal; and a plurality of electrode means electrically connected to said body.

19. The electric resistor according to claim 18, wherein said oxide substance includes cobalt oxide, the total quantity of the gram atomic weight of the cobalt included in said fine grains of crystal and said oxide substance being not more than 30% of the total quantity of the gram atomic weight of metallic elements included in said fine grains of crystals and said oxide substance.

20. The electric resistor according to claim 19, wherein said oxide substance further includes an oxide of at least one element selected from the group consisting of magnesium, calcium, barium, strontium, lead, lanthanum, phosphorus, boron, silicon, tellurium, uranium, and sodium.

21. An electric resistor comprising: a body composed substantially of fine grains of crystal of vanadium dioxide, containing therein manganese in the state of solid-solution; and an oxide substance enclosing said fine grains of crystal; and a plurality of electrode means electrically connected to said body.

22. The electric resistor according to claim 21, wherein said oxide substance includes manganese oxide, the total quantity of the gram atomic weight of the manganese included in said fine grains of crystal and said oxide substance being not more than 20% of the total quantity of the gram atomic weight of metallic elements included in said fine grains of crystal and said oxide substance.

23. The electric resistor according to claim 22, wherein said oxide substance further includes an oxide of at least one element selected from the group consisting of magnesium, calcium, barium, strontium, lead, lanthanum, phosphorus, boron, silicon, tellurium, uranium, and sodium.

24. An electric resistor comprising: a body composed substantially of fine grains of crystal of vanadium dioxide containing therein titanium in the state of solid-solution; and an oxide substance enclosing said fine grains of crystal; and a plurality of electrode means electrically connected to said body.

25. The electric resistor according to claim 24, wherein said oxide substance includes titanium oxide, the total quantity of the gram atomic weight of the titanium included in said fine grains of crystal and said oxide substance being not more than 20% of the total quantity of the gram atomic weight of metallic elements included in said fine grains of crystal and said oxide substance.

26. The electric resistor according to claim 25, wherein said oxide substance further includes an oxide of at least one element selected from the group consisting of magnesium, calcium, barium, strontium, lead, lanthanum, phosphorus, boron, silicon, tellurium, uranium, and sodium.

27. An electric resistor comprising: a body composed substantially of fine grains of crystal of vanadium dioxide, containing therein nickel in the state of solid-solution; and an oxide substance enclosing said fine grains of crystal; and a plurality of electrode means electrically connected to said body.

28. The electric resistor according to claim 27, wherein said oxide substance includes nickel oxide and an oxide of at least one element selected from the group consisting of magnesium, calcium, barium, strontium, lead, lanthanum, phosphorus, boron, silicon, tellurium, uranium, and sodium, the total quantity of the gram atomic weight of the nickel included in said fine grains of crystal and said oxide substance being not more than 30% of the total quantity of the gram atomic weight of metallic elements included in said fine grains of crystal and said oxide substance.

29. An electric resistor comprising: a body composed substantially of fine grains of crystal of vanadium dioxide, containing therein niobium in the state of solid-solution; and an oxide member enclosing said fine grains of crystal; and a plurality of electrode means electrically connected to said body.

30. The electric resistor according to claim 29, wherein said oxide substance includes niobium oxide, the total quantity of the gram atomic weight of the niobium included in said fine grains of crystal and said oxide substance being not more than 1% of the total quantity of the gram atomic weight of metallic elements included in said fine grains of crystal and said oxide substance.

31. The electric resistor according to claim 29, wherein said oxide substance includes niobium oxide and an oxide of at least one element selected from the group consisting of magnesium, calcium, barium, strontium, lead, lanthanum, phosphorus, boron, silicon, tellurium, uranium, and sodium, the total quantity of the gram atomic weight of the niobium included in said fine grains of crystal and said oxide substance being not more than 5% of the total quantity of the gram atomic weight of metallic elements included in said fine grains of crystal and said oxide substance.

32. An electric resistor comprising: a body composed substantially of fine grains of crystal of vanadium dioxide, containing therein tungsten in the state of solid-solution; and an oxide substance enclosing said fine grains of crystal; and a plurality of electrode means electrically connected to said body.

33. The electric resistor according to claim 32, wherein said oxide substance includes tungsten oxide, the total quantity of the gram atomic weight of the tungsten included in said fine grains of crystal and said oxide substance being not more than 1% of the total quantity of the gram atomic weight of metallic elements included in said fine grains of crystal and said oxide substance.

34. The electric resistor according to claim 33, wherein said oxide substance further includes an oxide of at least one element selected from the group consisting of magnesium, calcium, barium, strontium, lead, lanthanum, phosphorus, boron, silicon, tellurium, uranium, and sodium.

35. An electric resistor comprising: a body composed substantially of fine grains of crystal of vanadium dioxide containing therein molybdenum in the state of solid-solution; and an oxide substance enclosing said fine grains of crystal; and a plurality of electrode means electrically connected to said body.

36. The electric resistor according to claim 35, wherein said oxide substance includes molybdenum oxide, the total quantity of the gram atomic weight of the molybdenum included in said fine grains of crystal and said oxide substance being not more than 10% of the total quantity of the gram atomic weight of metallic elements included in said fine grains of crystal and said oxide substance.

37. The electric resistor according to claim 36, wherein said oxide substance further includes an oxide of at least one element selected from the group consisting of magnesium, calcium, barium, strontium, lead, lanthanum, phosphorus, boron, silicon, tellurium, uranium, and sodium.

38. An electric resistor comprising: a body composed substantially of fine grains of crystal of vanadium dioxide containing therein tantalum in the state of solid-solution; and an oxide substance enclosing said fine grains of crystal, and a plurality of electrode means electrically connected to said body.

39. The electric resistor according to claim 38, wherein said oxide substance includes tantalum oxide, the total quantity of the gram atomic weight of the tantalum included in said fine grains of crystal and said oxide substance being not more than 10% of the total quantity of the gram atomic weight of metallic elements included in said fine grains of crystal and said oxide substance.

40. The electric resistor according to claim 39, wherein said oxide substance further includes an oxide of at least one element selected from the group consisting of magnesium, calcium, barium, strontium, lead, lanthanum, phosphorus, boron, silicon, tellurium, uranium, and sodium.

41. An electric resistor comprising: a body composed substantially of fine grains of crystal of vanadium dioxide containing therein chromium in the state of solid-solution; and an oxide substance enclosing said fine grains of crystal, and a plurality of electrode means electrically connected to said body.

42. The electric resistor according to claim 41, wherein said oxide substance includes chromium oxide, the total quantity of the gram atomic weight of the chromium included in said fine grains of crystal and said oxide substance being not more than 10% of the total quantity of the gram atomic weight of metallic elements included in said fine grains of crystal and said oxide substance.

43. The electric resistor according to claim 41, wherein said oxide substance includes chromium oxide and an oxide of at least one element selected from the group consisting of magnesium, calcium, barium, strontium, lead, lanthanum, phosphorus, boron, silicon, tellurium, uranium, and sodium, the total quantity of the gram atomic weight of the chromium included in said fine grains of crystal and said oxide substance being not more than 20% of the total quantity of the gram atomic weight of metallic elements included in said fine grains of crystal and said oxide substance.

44. An electric resistor comprising: a body composed substantially of fine grains of crystal of vanadium dioxide containing therein at least one 3d-transition element other than vanadium in the state of solid-solution; and an oxide substance enclosing said fine grains of crystal said oxide substance including an oxide of at least one element selected from the group consisting of magnesium, calcium, barium, strontium, lead, lanthanum, phosphorus, boron, silicon, tellurium, uranium, and sodium; and a plurality of electrode means electrically connected to said body.

45. A method of producing oxide semiconductors comprising the steps of: preparing a powdered mixture including vanadium pentoxide and an oxide of at least one element selected from the group consisting of germanium, iron, cobalt, nickel, manganese, titanium, niobium, tungsten, molybdenum, tantalum and chromium, the gram atomic weight of the vanadium included in said mixture being not less than 50% of the total quantity of the gram atoms of the metallic elements in said mixture; reducing said powdered mixture at a temperature below the melting point of the vanadium pentoxide for at least several tens of minutes; and heat-treating the reduced mixture at a temperature above the melting point of vanadium pentoxide for at least several minutes.

46. The method according to claim 45, wherein said powdered mixture further includes an oxide of at least one element selected from the group consisting of magnesium, calcium, barium, strontium, lead, lanthanum, phosphorus, boron, silicon, tellurium, uranium and sodium.

47. The method according to claim 45, wherein said reduction of said powdered mixture is continued for a period of 30 to 120 minutes.

48. The method according to claim 45, wherein said reduction of said powdered mixture is carried out at a temperature between 350 to 400 centigrade.

49. The method according to claim 45, wherein said heat-treatment of the reduced mixture is carried out at a temperature not less than 1,000 degrees centigrade.

50. A method of producing oxide semiconductors comprising: preparing a material composition including vanadium pentoxide, an oxide of at least one element selected from the first group consisting of germanium, iron, cobalt, nickel, manganese, titanium, niobium, tungsten, molybdenum, tantalum and chromium, and an oxide of at least one element selected from the second group consisting of magnesium, calcium, barium, strontium, lead, lanthanum, phosphorus, boron, silicon, tellurium, uranium and sodium; fusing said material composition to fully mix by heat-treatment at a temperature above the melting point of vanadium pentoxide; completely pulverizing said material composition; reducing said pulverized material composition at a temperature between 350 and 400 degrees centigrade for a period 30 to 120 minutes; shaping said reduced material composition into a desired form; and sintering said shaped material composition at a temperature above the melting point of vanadium pentoxide for at least several minutes.

51. In an electric resistor composed of a sintered body and at least two electrodes apart from each other and electrically connected to said sintered body, an improvement wherein said sintered body consists essentially of fine grains of crystal of vanadium dioxide containing therein at least one element selected from the group consisting of germanium, iron, cobalt, nickel, manganese, titanium, niobium, tungsten, molybdenum, tantalum, and chromium in the state of solid-solution, said sintered body further comprising an oxide member enclosing said fine grains of crystal to electrically connect said fine grains of crystal to said electrodes.

References Cited

UNITED STATES PATENTS

| | | | |
|---|---|---|---|
| 2,700,720 | 1/1955 | Torok | 338—22 |
| 2,786,819 | 3/1957 | Smith et al. | 338—22 |
| 3,241,009 | 3/1966 | Dewald et al. | 252—518 |
| 3,275,572 | 9/1966 | Ruben | 252—518 |
| 3,278,317 | 10/1966 | Blair et al. | 252—518 |

OTHER REFERENCES

"Semiconducting Properties of Some Vanadate Glasses," by P. L. Baynton et al., Journal of the Electrochemical Society, vol. 104, No. 4, pp. 237–240.

LEON D. ROSDOL, *Primary Examiner.*

J. D. WELSH, *Assistant Examiner.*